United States Patent
Zou

(10) Patent No.: US 12,424,879 B2
(45) Date of Patent: Sep. 23, 2025

(54) EFFICIENT TRANSFER OF POWER IN A WIRELESS POWER TRANSFER SYSTEM

(71) Applicant: Telefonaktiebolaget LM Ericsson (publ), Stockholm (SE)

(72) Inventor: Gang Zou, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/849,795

(22) PCT Filed: Feb. 24, 2023

(86) PCT No.: PCT/EP2023/054705
§ 371 (c)(1),
(2) Date: Sep. 23, 2024

(87) PCT Pub. No.: WO2023/180006
PCT Pub. Date: Sep. 28, 2023

(65) Prior Publication Data
US 2025/0219453 A1     Jul. 3, 2025

(30) Foreign Application Priority Data
Mar. 24, 2022  (SE) .................................. 2230088-3

(51) Int. Cl.
*H02J 50/20* (2016.01)
*H02J 50/80* (2016.01)

(52) U.S. Cl.
CPC .............. *H02J 50/20* (2016.02); *H02J 50/80* (2016.02)

(58) Field of Classification Search
CPC .................................. H02J 50/20; H02J 50/80
See application file for complete search history.

(56) References Cited

U.S. PATENT DOCUMENTS

| 2019/0089207 A1 | 3/2019 | Kim et al. |
| 2020/0106308 A1 | 4/2020 | Kim et al. |

(Continued)

FOREIGN PATENT DOCUMENTS

| EP | 3297123 A1 | 3/2018 |
| EP | 3934057 A1 | 1/2022 |

(Continued)

OTHER PUBLICATIONS

Ayir, Nachiket, et al., "Impact of Software-Defined Radio Transmitter on the Efficiency of RF Wireless Power Transfer", 2020 IEEE Wireless Power Transfer Conference (WPTC), Seoul, Korea, Nov. 15-19, 2020, pp. 83-86.

(Continued)

*Primary Examiner* — Daniel Cavallari
(74) *Attorney, Agent, or Firm* — Murphy, Bilak & Homiller, PLLC

(57) ABSTRACT

Power is wirelessly transferred by means of radiative coupling from a wireless power transmitter, WPTx, (101) to a wireless power receiver, WPRx, (103). The WPTx (101) obtains (701, 709, 711) a set of conversion efficiency/input power relationships (501, 503, 505, 601, 603, 605, 651, 653, 655, 657, 659, 661) by, for each one of a plurality of different waveform types (300, 400), obtaining for said each one of the different waveform types (300, 400), a relationship (501, 503, 505, 601, 603, 605, 651, 653, 655, 657, 659, 661) between input signal power at the WPRx (103) and efficiency of radiofrequency-to-direct current, RF-to-DC, conversion of the input signal power by the WPRx (103). The WPTx (101) obtains (703) a prediction that indicates at what received signal power level a received transmission of power from the WPTx (101) will be at the WPRx (103) and uses (705) the prediction of received signal power at the WPRx (103) and the set of conversion efficiency/input (Continued)

power relationships (501, 503, 505, 601, 603, 605, 651, 653, 655, 657, 659, 661) to identify which one or more of the different waveform types (300, 400) satisfies a predetermined selection criterion and selects one of the one or more identified waveform types (300, 400). The WPTx (101) transmits a wireless power transfer signal (105) having the selected waveform type (300, 400).

9 Claims, 11 Drawing Sheets

(56) References Cited

U.S. PATENT DOCUMENTS

| | | |
|---|---|---|
| 2020/0389054 A1 | 12/2020 | Vedady Moghadam Nanehkaran et al. |
| 2021/0119726 A1 | 4/2021 | Kim et al. |

FOREIGN PATENT DOCUMENTS

| | | |
|---|---|---|
| KR | 20190080728 A | 7/2019 |
| WO | 2020131834 A1 | 6/2020 |
| WO | 2020210283 A1 | 10/2020 |

OTHER PUBLICATIONS

Clerckx, Bruno, et al., "Waveform Design for Wireless Power Transfer", IEEE Transactions on Signal Processing, vol. 64, No. 23, Dec. 1, 2016, pp. 6313-6328.
Joan, Mercade, "Multi-Tone Signal Generation with AWGs", Tabor Electronics, White Paper, Rev. 1.0, Apr. 12, 2021, pp. 1-36.
Litvinenko, Anna, et al., "The Impact of Waveform on the Efficiency of RF to DC Conversion Using Prefabricated Energy Harvesting Device", 2017 Advances in Wireless and Optical Communications, 2017, pp. 61-66.
Park, Jong Jin, et al., "Dual Mode SWIPT: Waveform Design and Transceiver Architecture with Adaptive Mode Switching Policy", 2018 IEEE 87th Vehicular Technology Conference (VTC Spring), Porto, Portugal, 2018, pp. 1-5.
Park, Jong Jin, et al., "Transmitter-Oriented Dual-Mode SWIPT With Deep-Learning-Based Adaptive Mode Switching for IoT Sensor Networks", IEEE Internet of Things Journal, vol. 7, No. 9, Sep. 2020, pp. 8979-8992.
Park, Jong Jin, et al., "Unified Simultaneous Wireless Infor1nation and Power Transfer for IoT: Signaling and Architecture with Deep Learning Adaptive Control", IEEE Internet of Things, vol. 9, Jun. 26, 2021, pp. 1-15.
Soares Boaventura, Alírio, et al., "Maximizing DC Power in Energy Harvesting Circuits Using Multisine Excitation", 2011 IEEE MTT-S International Microwave Symposium, Baltimore, MD, USA, 2011, pp. 1-4.
Soares Boaventura, Alírio J., et al., "Spatial Power Combining of Multi-Sine Signals for Wireless Power Transmission Applications", IEEE Transactions on Microwave Theory and Techniques, vol. 62, No. 4, Apr. 2014, pp. 1022-1029.
Trotter, Matthew S., "Power-Optimized Waveforms for Improving the Range and Reliability of RFID Systems", 2009 IEEE International Conference on RFID, 2009, pp. 80-87.

EFFICIENT TRANSFER OF POWER IN A WIRELESS POWER TRANSFER SYSTEM

BACKGROUND

The present invention relates to technology for wirelessly transferring power from a radiofrequency power source to a device, and more particularly to wirelessly transferring power with improved power conversion efficiency, and even more particularly to technology that employs an adaptive wireless power transfer strategy that achieves improved power conversion efficiency for each of a number of different devices having respective different conversion characteristics.

Wireless Power Transfer (WPT) via radiofrequency (RF) signals is attracting more and more attention. One reason is because energy harvesting from far field RF signals can supply power to so-called "zero-energy devices" such as wireless sensors and other devices in the Internet of Things (IoTs). What characterizes these as zero-energy devices is that, from the end-user perspective, they operate without a battery. Instead, such devices harvest energy from their surroundings.

One of the main challenges of WPT is finding ways of increasing the efficiency of RF-to-DC conversion at the Wireless Power Receiver (WPRx). Various studies show that RF-to-DC conversion efficiency of a WPRx is not only a function of its circuit design but also of the waveform of its input signal. Sec, for example, B. Clerckx and E. Bayguzina, "Waveform Design for Wireless Power Transfer", IEEE Trans. On Signal Processing. Vol. 64, No. 23, December 2016; A. S. Boaventura and N. B. Carvalho, "Maximizing DC Power in Energy Harvesting Circuits Using Multisine Excitation", 2011 IEEE MTT-S International Microwave Symposium; and M. S. Trotter. J. D. Griffin and G. D. Durgin, "Power Optimized Waveforms for Improving the Range and Reliability of RFID Systems" 2009 IEEE International Conference on RFID. Such investigations have shown, through analysis, simulations, and measurements involving multi-sine signal excitation, that RF-to-DC conversion efficiency is higher for a multi-sine signal than for a single sinewave signal. To overcome the problem of amplifying large peak average power ratio (PAPR) signals, A. J. S. Boaventura et al. "Spatial Power Combining of Multi-Sine Signals for Wireless Power Transmission Applications", IEEE Trans. On Microwave Theory and Techniques, Vol. 62, No. 4, April, 2014 describes a spatial power combining method to create high PAPR multi-sine signals in free space, where individual sine tones are amplified and radiated separately.

In the above-mentioned A. S. Boaventura and N. B. Carvalho, "Maximizing DC Power in Energy Harvesting Circuits Using Multisine Excitation", 2011 IEEE MTT-S International Microwave Symposium; and M. S. Trotter. J. D. Griffin and G. D. Durgin, "Power Optimized Waveforms for Improving the Range and Reliability of RFID Systems" 2009 IEEE International Conference on RFID, it is proved that, for a given transmission power, increasing the number of subcarriers of the input multi-sine signal can increase the RF-to-DC efficiency of a WPRx. However, other parameters of the input multi-sine signal, such as the signal subcarrier spacing (SCS), subcarrier phase distribution, input power at the WPRx, and the like, were not included in the studies.

It is believed that conventional technology has failed to address other variables that affect WPT efficiency, such as the effect of RF channel conditions between the WPRx and its power source (e.g., a Wireless Power Transmitter—"WPTx"). Conventional approaches have also failed to address the fact that different WPRx's may have different power conversion characteristics.

There is therefore a need for WPT technology that addresses the above and/or related problems.

Further, the use of single-tone signals for wireless power has the problem of occupying a big portion of the frequency spectrum, generating disturbances in portions of the spectrum that are to be used for other purposes, such as legally protected or licensed parts of the spectrum.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that wirelessly transfers power by means of radiative coupling from a wireless power transmitter, WPTx, to a wireless power receiver, WPRx. In some but not necessarily all embodiments this involves the WPTx obtaining a set of conversion efficiency/input power relationships by, for each one of a plurality of different waveform types, obtaining for said each one of the different waveform types, a relationship between input signal power at the WPRx and efficiency of radiofrequency-to-direct current, RF-to-DC, conversion of the input signal power by the WPRx. The WPTx also obtains a prediction that indicates at what received signal power level a received transmission of power from the WPTx will be at the WPRx. The prediction of received signal power at the WPRx and the set of conversion efficiency/input power relationships are used to identify which one or more of the different waveform types satisfies a predetermined selection criterion and one of the one or more identified waveform types is selected. A wireless power transfer signal having the selected waveform type is then transmitted from the WPTx.

In another aspect of some but not necessarily all embodiments consistent with the invention, the predetermined selection criterion is association with a most efficient RF-to-DC conversion of the input signal power by the WPRx.

In yet another aspect of some but not necessarily all embodiments consistent with the invention, obtaining for said each one of the waveform types, the relationship between input signal power at the WPRx and efficiency of RF-to-DC conversion by the WPRx comprises obtaining one or more RF-to-DC conversion characteristics of the WPRx. The one or more RF-to-DC characteristics of the WPRx are used to derive, for said each one of the different waveform types, the relationship between input signal power at the WPRx and efficiency of RF-to-DC conversion by the WPRx.

In still another aspect of some but not necessarily all embodiments consistent with the invention, the plurality of different waveform types comprises: a single-tone signal; a multi-tone signal having a constant phase distribution; and a multi-tone signal having a random phase distribution.

In another aspect of some but not necessarily all embodiments consistent with the invention, the plurality of different waveform types comprises a first multi-tone signal having a first sub-carrier spacing; and a second multi-tone signal having a second sub-carrier spacing, wherein the first sub-carrier spacing is different from the second sub-carrier spacing.

In yet another aspect of some but not necessarily all embodiments consistent with the invention, wirelessly transferring power comprises the WPTx obtaining a radiofrequency channel model of an RF channel between the WPTx and the WPRx; and using the radiofrequency channel model to obtain the prediction of received signal power at the WPRx.

In still another aspect of some but not necessarily all embodiments consistent with the invention, obtaining the prediction of received signal power at the WPRx comprises receiving, from the WPRx, a measure of received signal power associated with a previously transmitted signal from the WPTx.

In another aspect of some but not necessarily all embodiments consistent with the invention, wirelessly transferring power comprises the WPTx obtaining information about radio resources that are available for use by the WPTx, wherein the radio resources are defined in the time and frequency domains. Further, using the prediction of received signal power at the WPRx and the set of conversion efficiency/input power relationships to identify which one or more of the different waveform types satisfies the predetermined selection criterion comprises identifying which one or more of the different waveform types is compatible with transmission on the available radio resources and is associated with a measure of RF-to-DC conversion efficiency between the WPTx and the WPRx that is not less than the measure of RF-to-DC conversion efficiency of any other waveform type that is compatible with the transmission on the available radio resources.

In yet another aspect of some but not necessarily all embodiments consistent with the invention, wirelessly transferring power comprises the WPTx receiving one or more RF-to-DC conversion characteristics of the WPRx. Further, obtaining for said each one of the different waveform types, the relationship between input signal power at the WPRx and efficiency of RF-to-DC conversion of the input signal power by the WPRx comprises using the received one or more RF-to-DC conversion characteristics of the WPRx as a basis for determining for said each one of the different waveform types, the relationship between input signal power at the WPRx and efficiency of RF-to-DC conversion of the input signal power by the WPRx.

In still another aspect of some but not necessarily all embodiments consistent with the invention, the RF-to-DC conversion characteristics of the WPRx comprise one or more of an RF-to-DC threshold voltage (Vth) of an RF-to-DC rectifier circuit of the WPRx; and a maximum input voltage (Vmax) of the RF-to-DC rectifier circuit of the WPRx.

In another aspect of some but not necessarily all embodiments consistent with the invention, obtaining for said each one of the different waveform types, the relationship between input signal power at the WPRx and efficiency of RF-to-DC conversion of the input signal power by the WPRx comprises receiving from the WPRx, for said each one of the different waveform types, the relationship between input signal power at the WPRx and efficiency of RF-to-DC conversion of the input signal power by the WPRx.

In yet another aspect of some but not necessarily all embodiments consistent with the invention, power is wirelessly transferred by means of radiative coupling from a wireless power transmitter. WPTx, to a wireless power receiver. WPR. In an aspect of some but not necessarily all embodiments consistent with the invention, this involves the WPRx communicating one or more RF-to-DC conversion characteristics of the WPRx to the WPTx and receiving a radiofrequency, RF, wireless power transfer signal transmitted by the WPTx. The WPRx converts the received RF wireless power transfer signal into a direct current, DC, signal.

In another aspect of some but not necessarily all embodiments consistent with the invention, the one or more RF-to-DC conversion characteristics of the WPRx comprise one or more of: an RF-to-DC threshold voltage (Vth) of an RF-to-DC rectifier circuit of the WPRx; and a maximum input voltage (Vmax) of the RF-to-DC rectifier circuit of the WPRx.

In yet another aspect of some but not necessarily all embodiments consistent with the invention, wirelessly transferring power involves the WPRx measuring a received power level of a signal transmitted by the WPTx; and communicating the measured received power level to the WPTx.

In still another aspect of some but not necessarily all embodiments consistent with the invention, wirelessly transferring power involves the WPRx obtaining information about a wireless power transfer signal, wherein the information comprises one or more of: a carrier frequency of the wireless power transfer signal; a bandwidth of the wireless power transfer signal; and a subcarrier spacing of the wireless power transfer signal. These embodiments further involve configuring a receiver of the WPRx based on the information about the wireless power transfer signal.

In another aspect of some but not necessarily all embodiments consistent with the invention, wirelessly transferring power by means of radiative coupling from a WPTx to a WPRx comprises the WPRx communicating a set of conversion efficiency/input power relationships to the WPTx, wherein the set of conversion efficiency/input power relationships comprises, for each one of a plurality of different waveform types, a relationship between input signal power at the WPRx and efficiency of radiofrequency-to-direct current, RF-to-DC, conversion of the input signal power by the WPRx, the WPRx receives a radiofrequency, RF, wireless power transfer signal transmitted by the WPTx; and converts the received RF wireless power transfer signal into a direct current, DC, signal.

In another aspect of some but not necessarily all embodiments consistent with the invention, wirelessly transferring power by means of radiative coupling from a WPTx to a WPRx comprises the WPRx measuring a received power level of a signal transmitted by the WPTx; and communicating the measured received power level to the WPTx.

In yet another aspect of some but not necessarily all embodiments consistent with the invention, wirelessly transferring power further comprises the WPRx obtaining information about a wireless power transfer signal, wherein the information comprises one or more of a carrier frequency of the wireless power transfer signal; a bandwidth of the wireless power transfer signal; and a subcarrier spacing of the wireless power transfer signal. The WPRx also configures a receiver of the WPRx based on the information about the wireless power transfer signal.

In still other aspects of some but not necessarily all embodiments consistent with the invention, a wireless communication device comprises a WPTx including any aspects as described herein. The wireless communication device can, as a non-limiting example, be a mobile phone, a wireless access point, or a base station.

In yet other aspects of some but not necessarily all embodiments consistent with the invention, a wireless communication device comprises a WPRx including any aspects as described herein. The wireless communication device can, as a non-limiting example, be a sensor device or an Internet of Things (IoT) device.

Another aspect of the present disclosure relates to a method of wirelessly transferring power by means of radiative coupling from a wireless power transmitter, WPTx, to a wireless power receiver, WPRx, the method being performed by the WPTx and comprising:

obtaining a set of conversion efficiency/input power relationships by, for each one of a plurality of different waveform types, obtaining for said each one of the different waveform types (300, 400), a relationship between input signal power at the WPRx and efficiency of radiofrequency-to-direct current, RF-to-DC, conversion of the input signal power by the WPRx;

obtaining a prediction that indicates at what received signal power level a received transmission of power from the WPTx will be at the WPRx;

using (705) the prediction of received signal power at the WPRx and the set of conversion efficiency/input power relationships to identify which one or more of the different waveform types satisfies a predetermined selection criterion and selecting one of the one or more identified waveform types; and transmitting, from the WPTx, a wireless power transfer signal having the selected waveform type, wherein the plurality of different waveforms types comprises:

a multi-tone signal having a constant phase distribution; and a multi-tone signal having a random phase distribution.

In one embodiment of the presently disclosed method above, a plurality of different waveform types (300, 400) comprises:

a first multi-tone signal having a first sub-carrier spacing; and a second multi-tone signal having a second sub-carrier spacing, wherein the first sub-carrier spacing is different from the second sub-carrier spacing.

The present disclosure further relates to a wireless power transmitter, WPTx, (101) for wirelessly transferring power by means of radiative coupling from the WPTx (101) to a wireless power receiver, WPRx, (103), the WPTx (101) being configured to carry out the above presently disclosed method.

The present disclosure further relates to a wireless power receiver, WPRx, (103) for wirelessly transferring power by means of radiative coupling from a wireless power transmitter, WPTx, (101) to the WPRx (103) the WPRx (103), wherein the WPRx, (103) is configured to carry out the presently disclosed above method.

The advantage of the method above, which uses multi-tone signals, is that the spectrum of the multi-tone signals, in particular of the random-phase multi-tone signals, is lower than the spectrum of single-tone signals, and therefore the spectrum occupancy of the multi-tone signals is preferable and may not infringe on parts of the spectrum that are allocated for other functions, such as licensed portions of the spectrum.

BRIEF DESCRIPTION OF THE DRAWINGS

The objects and advantages of the invention will be understood by reading the following detailed description in conjunction with the drawings in which.

DETAILED DESCRIPTION

Figure 1:
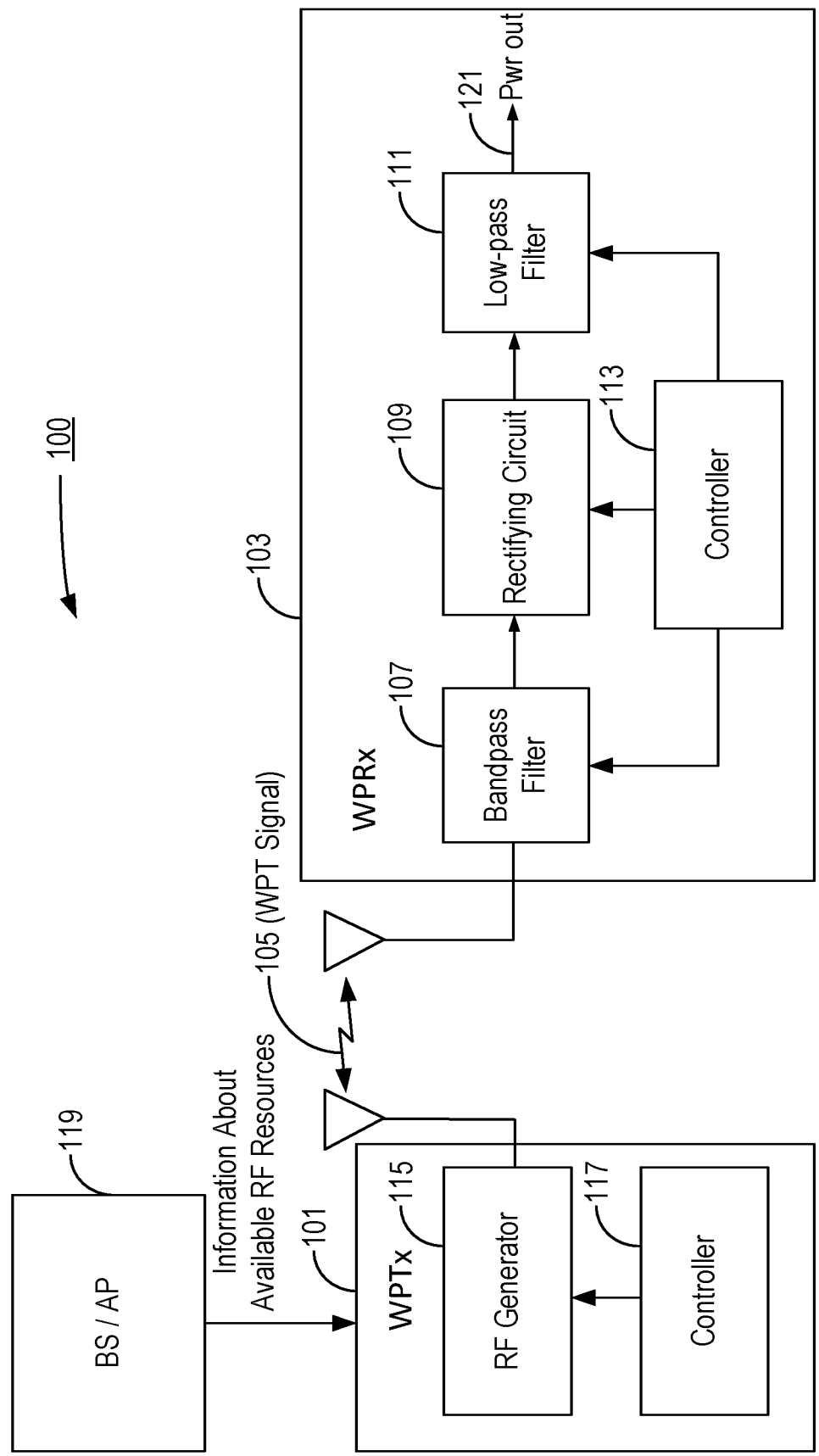
FIG. 1 is an illustration of a wireless power transfer system that includes a wireless power transmitter and a wireless power receiver.

The various features of the invention will now be described in connection with a number of exemplary embodiments with reference to the figures, in which like parts are identified with the same reference characters.

To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of non-transitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

As mentioned earlier, WPT technology is becoming increasingly important as more and more zero-energy embodiments of wireless sensors and other devices in the Internet of Things (IoTs) are deployed. Transferring energy in this manner involves generating and then transmitting an RF signal which is then received at the WPRx. Circuitry within the WPRx then rectifies the received RF signal to produce a DC signal. A number of factors affect the efficiency at which energy can be wirelessly transferred in this manner.

To address these and/or related issues, in one aspect of embodiments consistent with the invention, the WPTx selects, from a number of different possible waveform types, the waveform to be transmitted, with selection being made in a manner that achieves a high level of energy transfer efficiency.

In another aspect of embodiments consistent with the invention, selection of waveform type is based on energy conversion characteristics at the WPRx. In another aspect, the selection is further based on a prediction of a received signal power level of the signal transmitted from the WPTx and received by the WPRx. These selections are made with the goal of enhancing RF-to-DC conversion efficiency at WPRx.

Aspects of embodiments consistent with the invention will now be described in greater detail.

Referring now to FIG. 1, a WPT system 100 includes a WPTx 101 and a WPRx 103. The WPTx 101 generates and transmits WPT RF signals 105. The WPTx 101 can be embodied as a standalone device. The WPTx 101 can alternatively be integrated into any number of different types of devices, including but not limited to a mobile phone, an Access Point (AP) or a base station (BS). The WPRx 103 can also be embodied as a standalone device, but alternatively is advantageously embodied as a circuit that can be integrated into a low power device that contains additional application electronics (e.g., sensors, communication, data processing etc.). The WPRx 103 harvests the electromagnetic energy of the RF WPT signals 105, and rectifies/filters the signals to generate DC power. This aspect of the technology, which generates DC power from RF power through rectification, is well-known, and may involve for example a bandpass filter 107 that supplies a filtered RF signal to a rectifying circuit 109 which in turn supplies a rectified signal to a low-pass filter 111 that generates the DC power output signal 121. It may also include a power management circuit (e.g., a boost converter circuit) to convert the DC power to a desired voltage level so that the DC power can supply the application circuits in the device, or be stored (e.g., in a small battery, a super capacitor, or other energy storage device) so that the device can perform higher-power low duty-cycle operation.

In an aspect of some embodiments consistent with the invention, the WPRx 103 further includes a controller 113 for configuring operation of the bandpass filter 107, rectifying circuit 109, and low-pass filter 111. For example, in some embodiments the WPRx 103 may have knowledge (e.g., by being pre-configured with the information, or by receiving it through a communication from the WPTx 101 or other source) about which WPT RF resource(s) (e.g., carrier frequency, bandwidth, etc.) are being used to convey the WPT signal 105. In such cases, the controller 113 can tune the bandpass filter and other components of the WPRx's receiver as necessary to receive the WPT signal 105.

In an aspect of embodiments consistent with the invention, in order to generate the WPT signal 105, the WPTx 101 includes, in this example, an RF generator 115 and a controller 117. The RF generator 115, under the control of the controller 117, generates a WPT signal 105 having a particular configuration, as will be described in greater detail below. One aspect of this control is configuring the WPT signal 105 to occupy particular radio resources (e.g., frequency, bandwidth, timing, duration, etc.) so as not to conflict with other uses (e.g., radio communications), and also to enable the WPRx 103 to know how to tune its receiver to receive the signal. In some but not necessarily all embodiments consistent with the invention, the WPTx 101 receives information about available radio resources from another source, such as a wireless communication system base station (BS) or access point (AP) 119.

Figure 2:
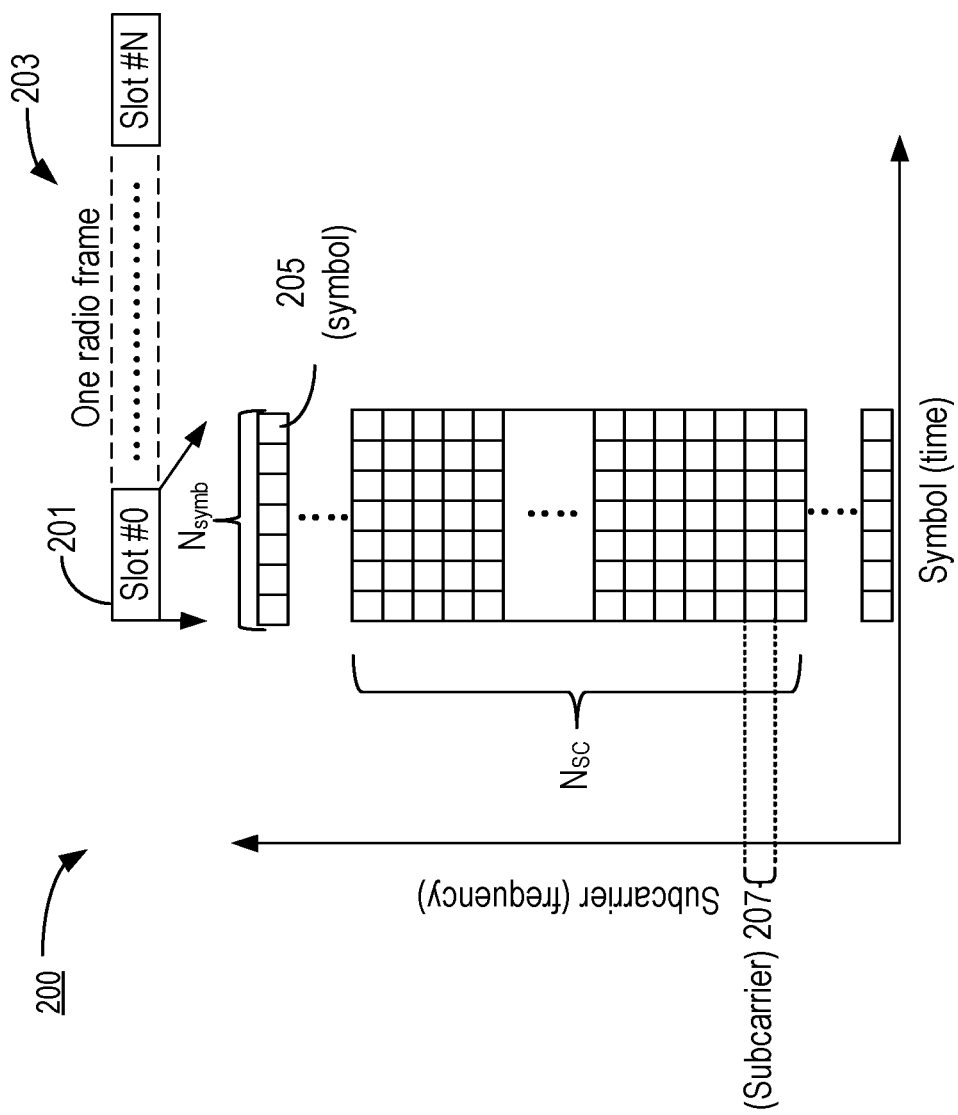
FIG. 2 is a diagram illustrating an exemplary wireless power transfer RF resource allocation in the frequency and time domains.

Referring now to FIG. 2, this shows an example of a WPT RF resource allocation 200 in the frequency and time domains. In this example, the time domain is divided up into a number of sequentially occurring slots, such as the illustrated slot 201. In some embodiments, the WPT signal 105 shares the air interface of a cellular communication system, in which case the slots 201 can be consistent with slots used by a radio frame 203 of that communication system. In alternative embodiments, the organization of RF resources for the WPT system 100 is not shared with any communication system, but it may nonetheless be advantageous to create an air interface for the WPT system 100 that involves radio frames 203 subdivided into slots 201. This may be the case, for example, when in order to achieve efficient power transfer to a number of different devices, time division multiplexing (TDM) is used to transmit differently configured WPT signals 105 at differently allocated times to respective different WPRx devices.

Slots 201 are, in this example, further subdivided into a plurality of symbols 205. In the time domain, the number of symbols 205 determines the duration of the WPT signal 105.

The frequency domain is subdivided into a plurality of subcarriers 207. In the frequency domain, the number of subcarriers (Nsc) and subcarrier spacing (SCS), $\Delta f$, determine the frequency bandwidth of the WPT signal 105.

Figure 3:
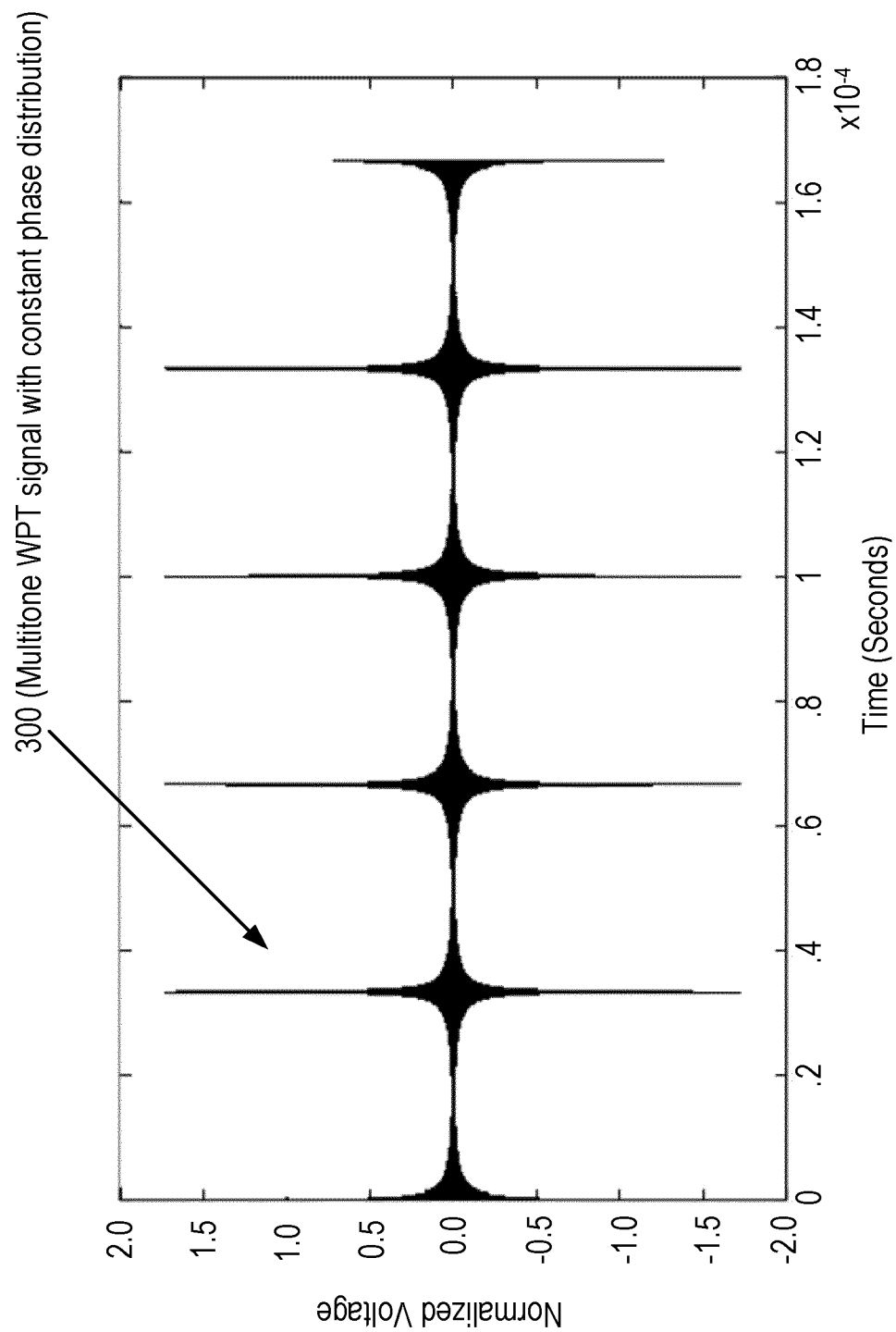
FIG. 3 shows an example of a simulated multitone wireless power transfer signal having 100 subcarriers, a 30 k Hz subcarrier spacing, and a constant phase distribution among the subcarriers equal to 90°.
Figure 4:
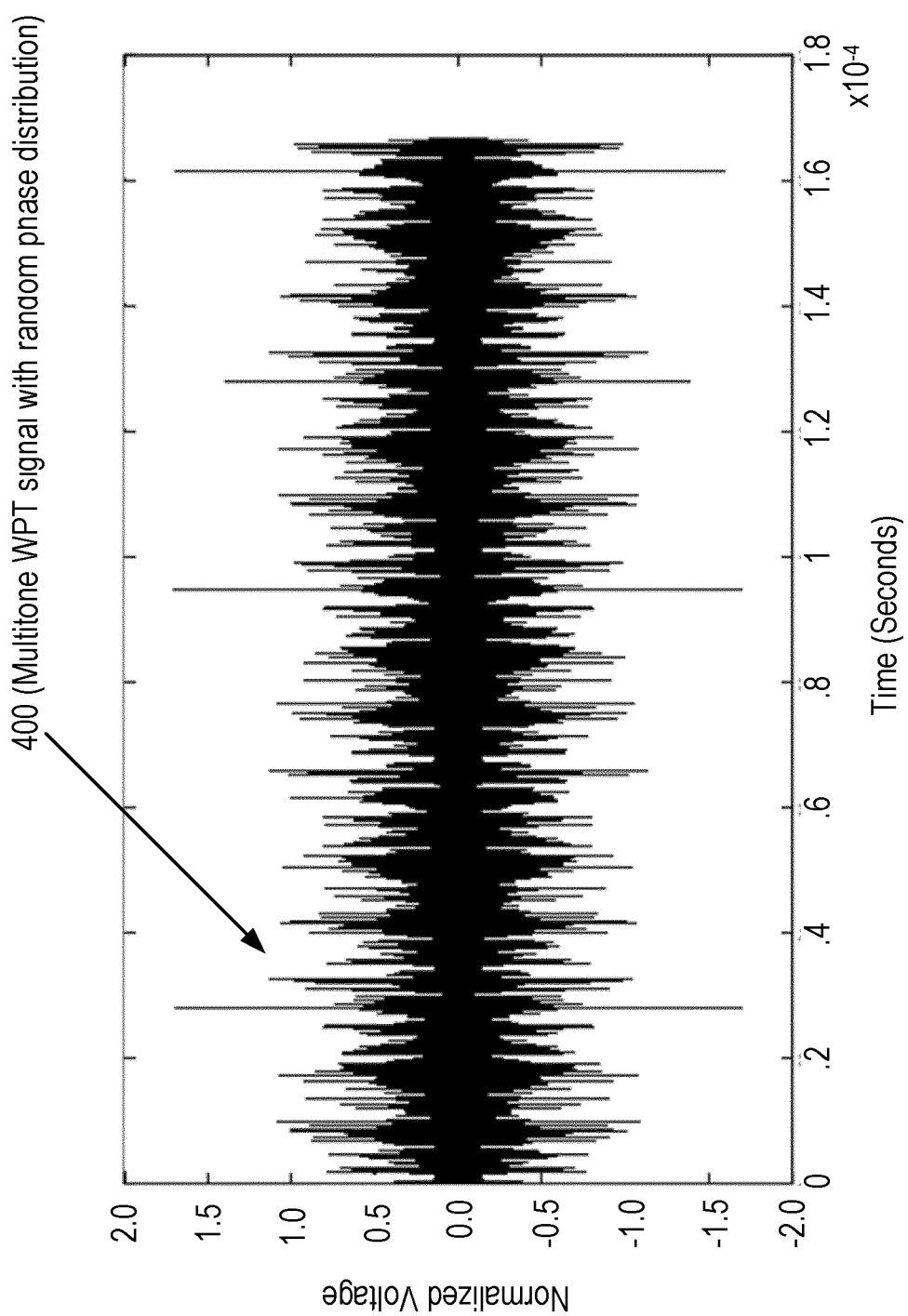
FIG. 4 shows an example of a simulated multitone wireless power transfer signal having 100 subcarriers, a 30 kHz subcarrier spacing, and a random phase distribution.

As mentioned earlier, an aspect of embodiments consistent with the invention is selection of a WPT signal 105 having one of a number of different waveform types. To illustrate this aspect, reference is made to FIG. 3, which shows an example of a simulated multitone WPT signal 300 with Nsc=100, $\Delta f$=30 kHz and a constant phase distribution of 90°. As a comparison, FIG. 4 shows an example of a simulated multitone WPT signal also with Nsc=100, $\Delta f$=30 kHz but in this case having a random phase distribution. The voltage amplitude of all subcarriers is normalized as "1" in both examples.

Two additional factors that can affect RF-to-DC conversion efficiency are input power level at the WPRx, and the number of subcarriers (Nsc) included within the WPT signal 105. The number of subcarriers to be transmitted is under the control of the WPTx 101, and is one aspect of the WPT signal selection process. The input power level of the received WPT signal 105 at the WPRx is a result of a number of factors, including the transmit power level applied at the WPTx 101, and the RF channel conditions between the WPRx 103 and the WPTx 101. Together, these determine the maximum available power, and how much of it is lost in the RF channel before it reaches the WPRx 103.

Figure 5:
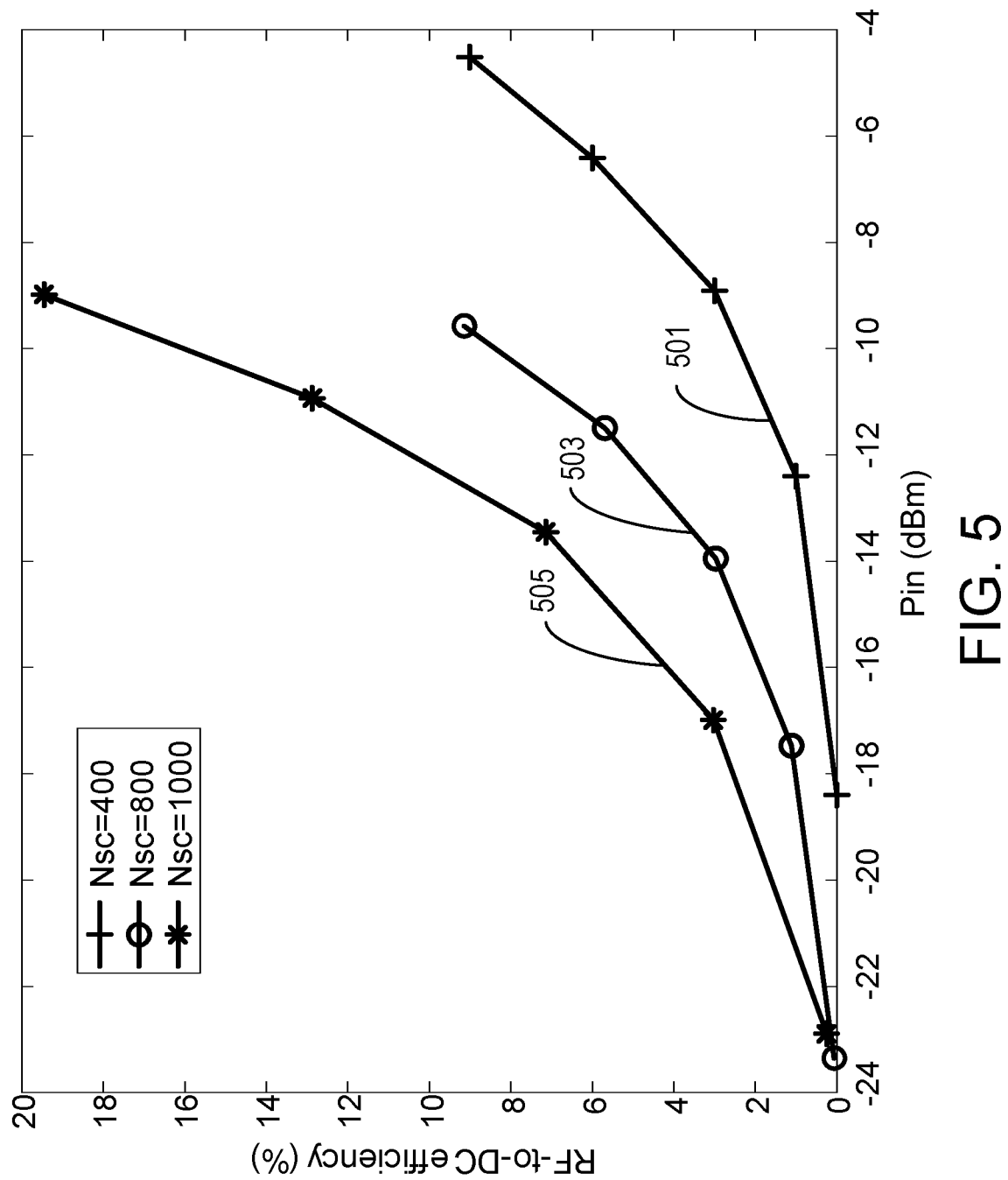
FIG. 5 shows three graphs of the relationship between input signal power at the wireless power receiver and RF-to-DC conversion efficiency over an indicated range of input signal power levels.

To illustrate the effect of these two factors, FIG. 5 shows three graphs 501, 503, 505 of the relationship between input signal power at the WPRx 103 and RF-to-DC conversion efficiency over the indicated range of input signal power levels. Graph 501 illustrates the relationship for the case of Nsc=400, graph 503 illustrates the relationship for the case of Nsc=800, and graph 505 illustrates the relationship for the case of Nsc=1000. It can be seen that, with subcarrier spacing being the same for all three examples, increasing the number of subcarriers can improve the RF-to-DC conversion efficiency for any given input power level within the indicated range at the WPRx 103.

Figure 6A:
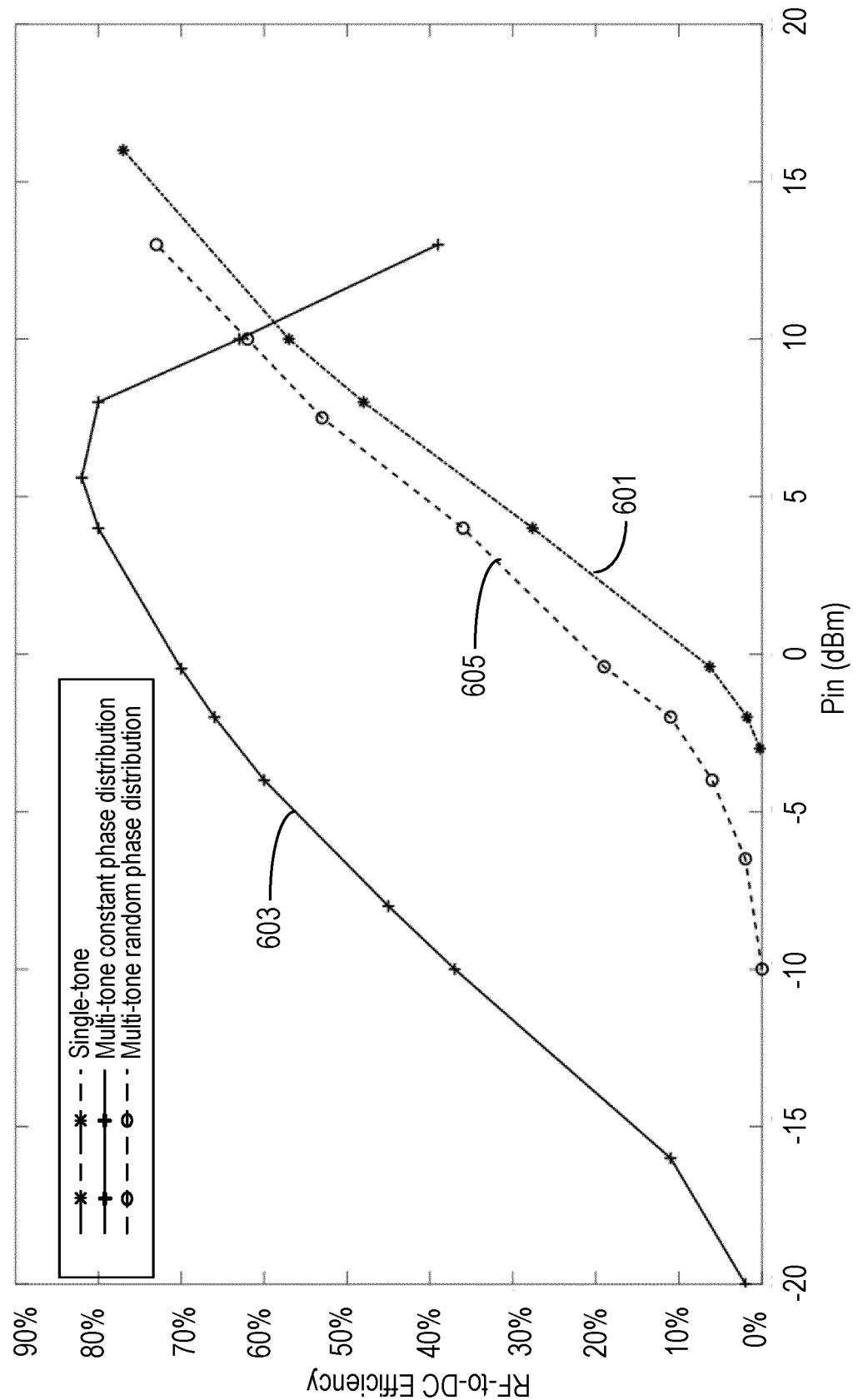
FIG. 6A depicts three graphs, each illustrating the relationship between received power at the wireless power receiver and RF-to-DC conversion efficiency for a respective one of three different wireless power transfer signal waveforms.

To further illustrate how waveform selection by the WPTx 101 can influence RF-to-DC conversion efficiency at the WPRx 103, reference is now made to FIG. 6A, which depicts three graphs 601, 603, and 605, each illustrating the relationship between received power at the WPRx 103 and RF-to-DC conversion efficiency for a respective one of three different WPT signal waveforms. Graph 601 shows the efficiency/power relationship when the waveform is a single-tone sine wave having a carrier frequency of 915 MHz and chirp linear frequency modulation. Graph 603 shows the efficiency/power relationship when the waveform is a multi-tone sine waveform made up of 100 subcarriers having a constant phase distribution and a subcarrier spacing of 30 kHz. Graph 605 shows the efficiency/power relationship for a multi-tone sine waveform also made up of 100 subcarriers with the subcarrier spacing of 30 kHz, but in this instance the phase distribution among the subcarriers is random.

It can be seen from a comparison of the graphs that the multi-tone sine waveform with constant phase distribution among subcarriers is more suitable when input power is low because that waveform type has a much higher RF-to-DC conversion efficiency than the other two waveforms. However, when the input power is higher than 10 dBm, the RF-to-DC efficiency of that waveform type begins to degrade, and the multi-tone sine waveform with random phase distribution has the higher efficiency instead.

Figure 6B:
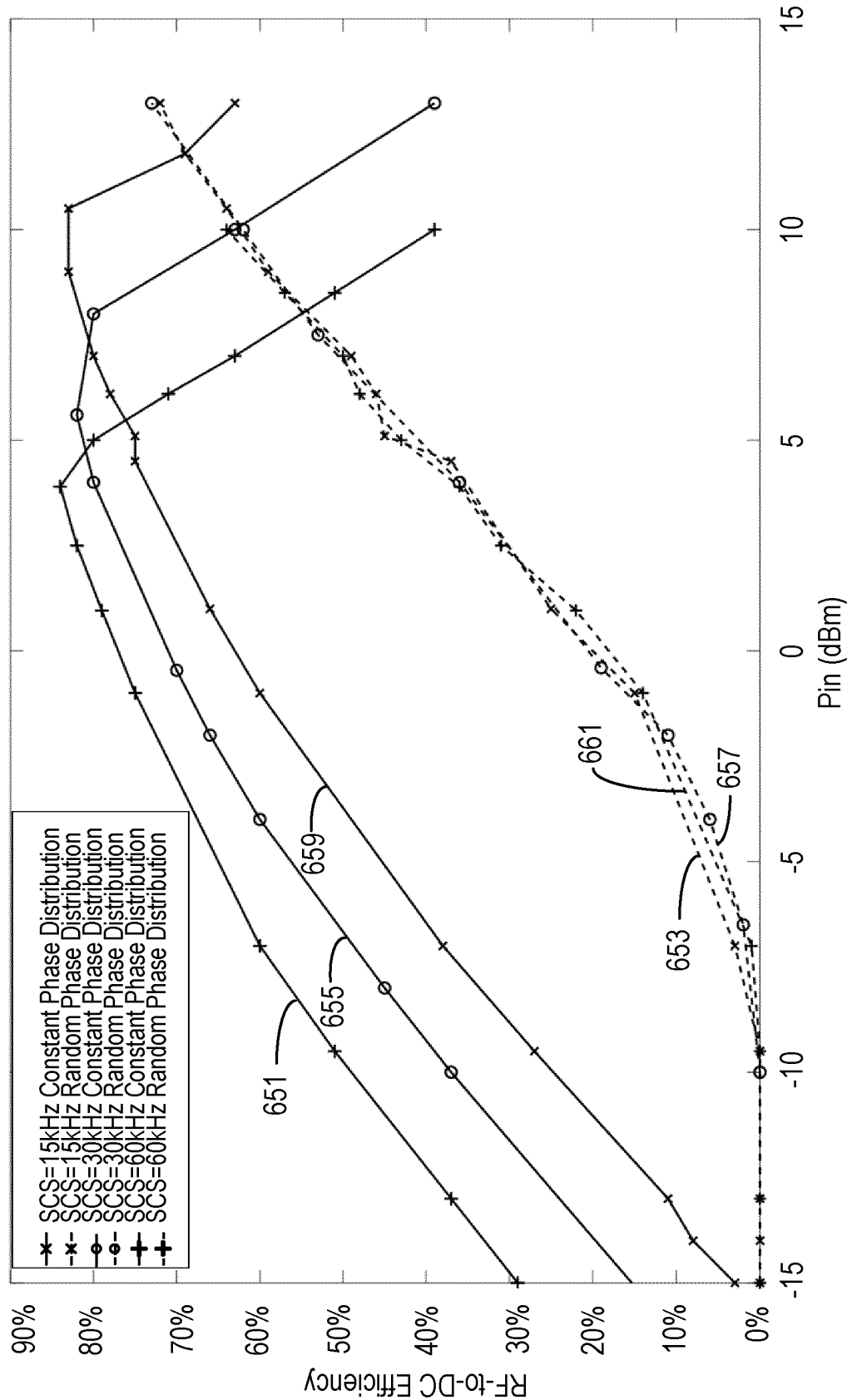
FIG. 6B depicts six graphs, each illustrating the relationship between received power at the wireless power receiver and RF-to-DC conversion efficiency for a respective one of six different wireless power transfer signal waveforms.

A further illustration of the relationship between waveform type and RF-to-DC conversion efficiency is shown in FIG. 6B. Six different multi-tone waveform types, each spanning a bandwidth of 30 MHz, are illustrated:

graph 651 illustrates the efficiency/power relationship for a multi-tone signal having a constant phase distribution among subcarriers and 15 kHz subcarrier spacing graph 653 illustrates the efficiency/power relationship for a multi-tone signal having a random phase distribution among subcarriers and 15 kHz subcarrier spacing graph 655 illustrates the efficiency/power relationship for a multi-tone signal having a constant phase distribution among subcarriers and 30 kHz subcarrier spacing graph 657 illustrates the efficiency/power relationship for a multi-tone signal having a random phase distribution among subcarriers and 30 kHz subcarrier spacing graph 659 illustrates the efficiency/power relationship for a multi-tone signal having a constant phase distribution among subcarriers and 60 kHz subcarrier spacing graph 661 illustrates the efficiency/power relationship for a multi-tone signal having a random phase distribution among subcarriers and 60 kHz subcarrier spacing It can be seen from a comparison of the graphs that for a good part of the power input range, the multi-tone waveforms having constant phase distribution result in a better RF-to-DC conversion efficiency, which is improved further the lower the subcarrier spacing is. The difference in performance between signals having constant phase distribution and those having random phase distribution is even more pronounced when the input power is low, with those waveforms having lower subcarrier spacing with constant phase distribution being associated with the better RF-to-DC conversion efficiency. For example, when Pin=−15 dBm, a multi-tone waveform having SCS=15 kHz with constant phase distribution results in an RF-to-DC conversion efficiency of ~30%, which is 25% higher than that for SCS=60 kHz with constant phase distribution.

It can also be seen from FIG. 6B that the performance of the multi-tone waveforms having constant phase distribution drops off beginning somewhere between about 4 dBm and 12 dBm, so that at about Pin=~13 dBm, the multi-tone waveform types with random phase distribution have the better performance.

Figure 7A:
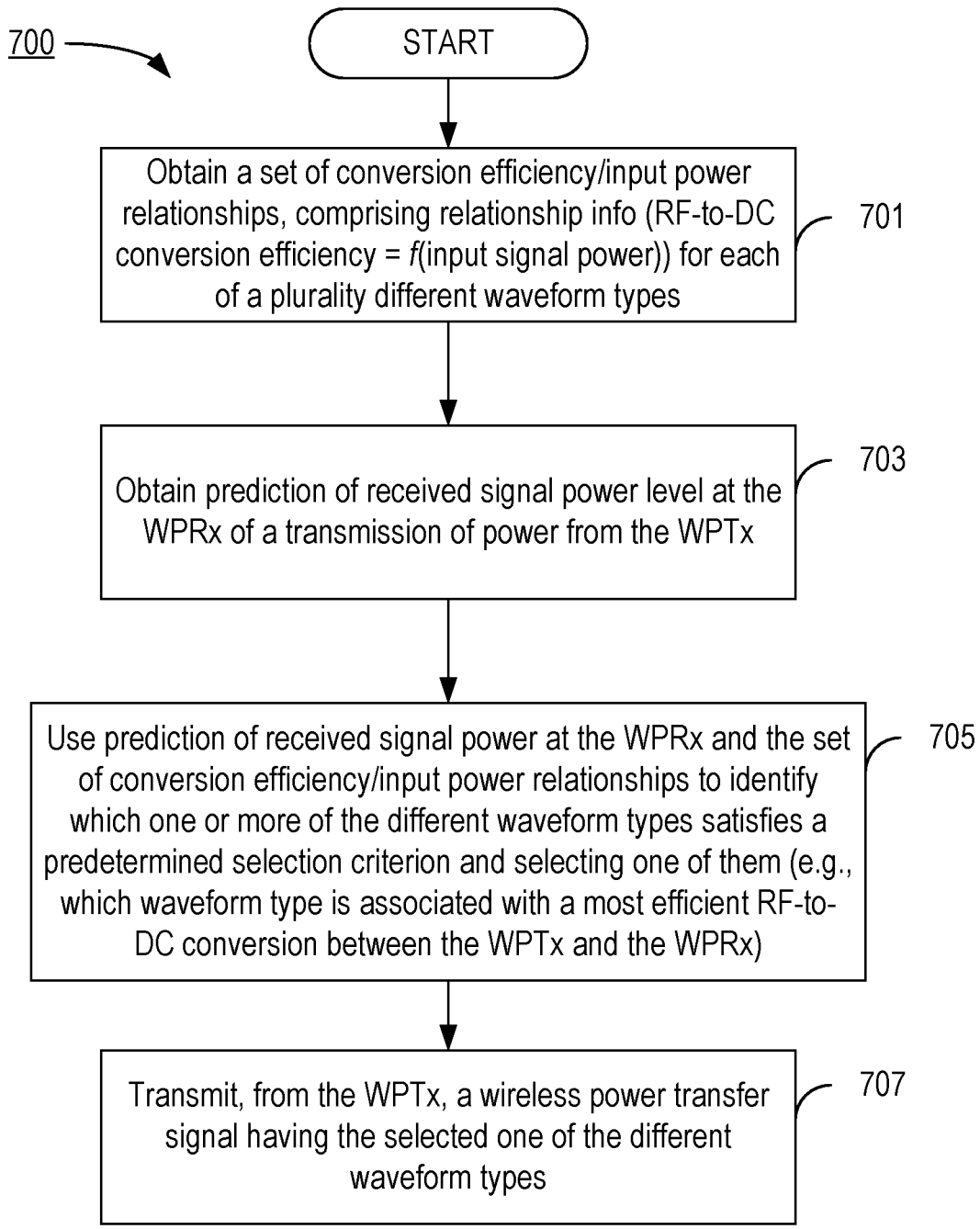
FIG. 7A is, in one respect, a flowchart of actions taken by a wireless power transmitter to select a configuration of the wireless power transfer signal that will achieve a criterion-satisfying level of RF-to-DC conversion efficiency.

Exemplary embodiments consistent with the invention are now further described with reference to FIG. 7A which in one respect is a flowchart of actions taken by a WPTx 101 to select a configuration of the WPT signal 105 that will achieve a satisfactory level of RF-to-DC conversion efficiency (e.g., a most efficient level of conversion efficiency, or a highest level of conversion efficiency that is obtainable while also satisfying one or more other criteria) when transmitted to a WPRx 103. FIG. 7A can also be considered to represent means 700 (e.g., hardwired or programmable circuitry or other processing means) for carrying out the described actions.

At step 701, the WPTx 101 obtains a set of conversion efficiency/input power relationships by, for each one of a plurality of different waveform types, obtaining for said each one of the different waveform types, a relationship between input signal power at the WPRx 103 and efficiency of RF-to-DC conversion of the input signal power by the WPRx 103. Such relationships were illustrated, without limitation, by the graphs 601, 603, and 605 in FIG. 6A and by the graphs 651, 653, 655, 657, 659, and 661 in FIG. 6B.

At step 703, the WPTx 101 obtains a prediction that indicates at what received signal power level a received transmission of power from the WPTx 101 will be at the WPRx 103.

At step 705, the WPTx 101 uses the prediction of received signal power at the WPRx and the set of conversion efficiency/input power relationships to identify which one or more of the different waveform types satisfies a predetermined selection criterion. This selection criterion can, for example, be the waveform type that achieves (i.e., is associated with) the highest level of RF-to-DC conversion efficiency at the predicted received signal power level from among the various waveform types that are being evaluated. The selection criterion is application-specific, and can take into consideration a number of different factors in different embodiments. For example, in addition to the level of RF-to-DC conversion efficiency that is achievable (relative to the achievable levels of conversion efficiency associated with other waveform types), the criterion might further take into consideration the amount of radiofrequency resource utilization that is associated with the waveform type. In some embodiments, this could result in a waveform type being selected that produces a satisfactory but not necessarily highest level of RF-to-DC conversion efficiency.

It is possible that, in some but not necessarily all embodiments, more than one of the different waveform types will be found to have satisfied the selection criterion. A simple but non-limiting example occurs when the selection criterion seeks to find the waveform type that is associated with the highest level of RF-to-DC conversion efficiency at the predicted received signal power level, and two or more waveform types would result in a same highest level. Under these circumstances, one of these should be selected. As non-limiting examples, the one that requires the fewest amount of radiofrequency resources and/or processing resources might be chosen. The basis for selection is application specific, making a complete description beyond the scope of this disclosure.

At step 707, the WPTx transmits a wireless power transfer signal having the selected one of the different waveform types.

Figure 7B:
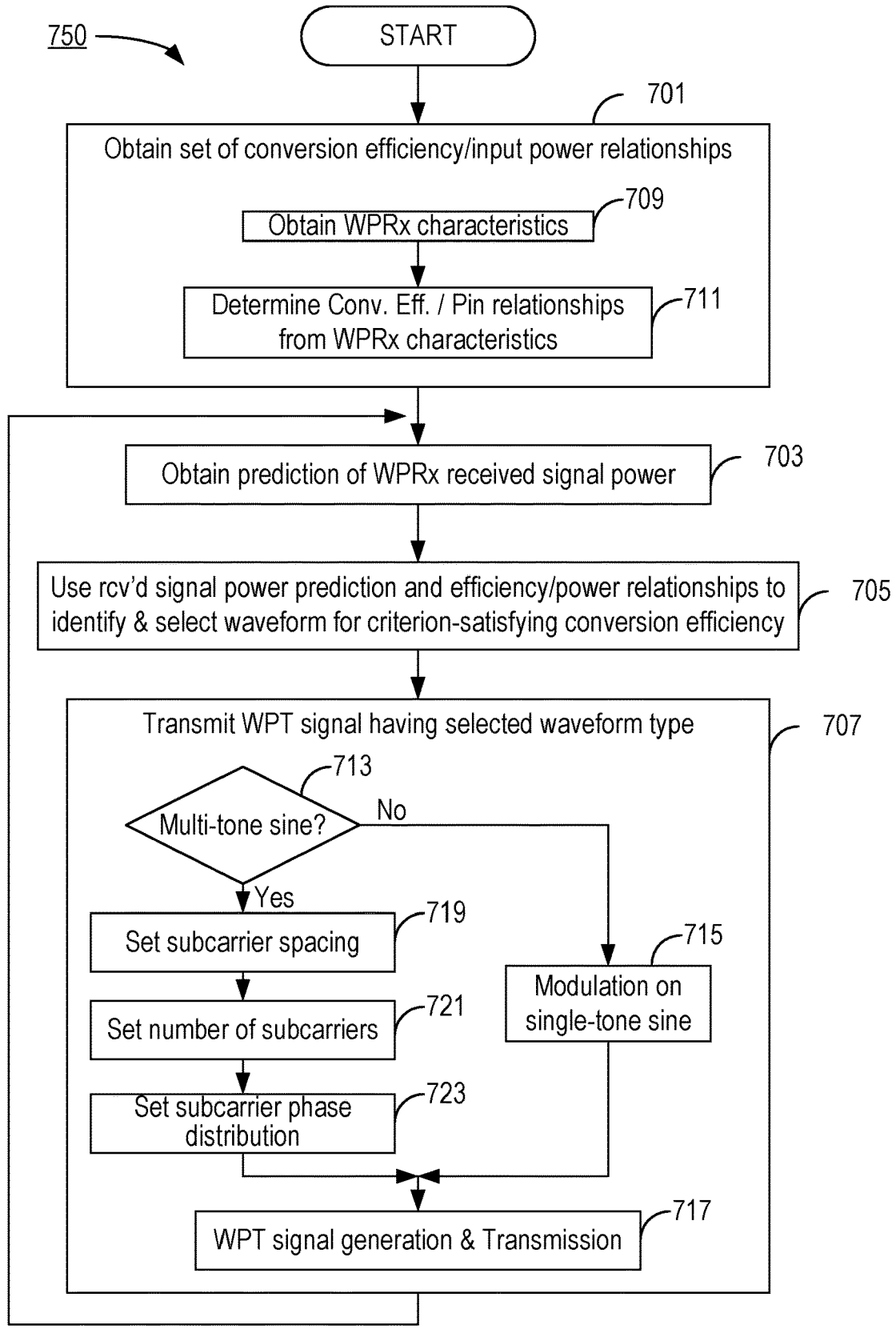
FIG. 7B is, in one respect, a flowchart of actions taken by a wireless power transmitter to select a configuration of the wireless power transfer signal that will achieve a criterion-satisfying level of RF-to-DC conversion efficiency.

Further aspects of embodiments consistent with the invention will now be described with reference to FIG. 7B, which in one respect is a flowchart of actions taken by a WPTx 101 to select a configuration of the WPT signal 105 that will achieve a satisfactory level of RF-to-DC conversion efficiency (e.g., a most efficient level of conversion efficiency, or a highest level of conversion efficiency that is obtainable while also satisfying one or more other criteria) when transmitted to a WPRx 103. FIG. 7B can also be considered to represent means 750 (e.g., hardwired or programmable circuitry or other processing means) for carrying out the described actions.

The class of embodiments illustrated in FIG. 7B follows the sequence of actions presented in FIG. 7A, and for some of these provides further nonlimiting exemplary implementation details. Accordingly, the WPTx 101 obtains a set of conversion efficiency/input power relationships (step 701) as described above. The WPTx 101 can obtain these by being preconfigured (e.g., having them stored in a table within the WPTx 101). For example, the WPTx 101 can fetch the WPRx's RF-to-DC efficiency vs, input RF power relationships for different WPT waveforms at the time of WPT system deployment. Alternatively, the relationships can be received in a communication from the WPRx 103.

Alternatively, these relationships can be derived from information about certain characteristics of the WPRx 103, and consistent with this approach, the illustrated embodiment includes obtaining characteristics of the WPRx 103 that relate to its RF-to-DC conversion hardware (step 709). One parameter that characterizes a WPRx RF-to-DC rectifier 109 is the threshold voltage (Vth). The value Vth represents the level that the input signal voltage amplitude must exceed before the RF-to-DC rectifier is able to generate DC output power from the input signal. Further increasing the input signal voltage above Vth causes the DC output power to increase correspondingly but only up to the point at which the input voltage amplitude reaches a value, Vmax, beyond which the DC output power will not increase with any further increase of input voltage amplitude. The RF-to-DC efficiency vs, input RF power for different WPT waveforms can be estimated based on these two parameters (Vth and Vmax).

Accordingly, in the exemplary embodiment of FIG. 7B, after obtaining the WPRx characteristics, the WPTx 101 uses the characteristics as a basis for determining the conversion efficiency/Pin relationships for each of the different waveform types that it is able to select from (step 711).

In some alternative embodiments, the WPTx 101 does not do this computation. Instead it is performed by the WPRx 103, which then sends the conversion efficiency/Pin relationship information to the WPTx 101, preferably using RF communications.

Next, the WPTx 101 obtains a prediction of signal power at the WPRx 103 (step 703). This prediction can be made from a model of the RF channel between the WPTx 101 and the WPRx 103. The RF channel model represents factors such as the relative positions of the WPTx 101 and the WPRx 103, signal propagation conditions, and the like. RF channel models are well-known in the art, and therefore need not be described here in detail.

Alternatively, the signal power at the WPRx 103 can be predicted by having the WPRx 103 report back a measured signal power of a previously received signal. The previously received signal can be configured as a WPT signal 105. Alternatively, the previously received signal can be a different signal, such as a signal that is used for communication channel estimation. The WPTx 101 may then use the channel status, which is reported from the WPRx 103 (or from the device in which the WPRx 103 is installed, depending on implementation) to predict the received power of the WPT signal 105 at the WPRx 103. The use of almost any type of transmitted signal, such as the just-described signal for communication channel estimation, is justified by the fact that the received power at the WPRx 103 varies very little with different waveform types having the same radio carrier frequency. If the previously received signal had a lower transmission power than that of the WPT signal 105, reported values of received power can be scaled up proportionately. Accordingly, a received power estimation based on any such signal is acceptable.

Once the WPTx 101 has the prediction of received signal power at the WPRx 103, it is able to use the set of RF-to-DC conversion efficiency relationships to find, for each of the waveform types under consideration, the level of conversion efficiency that is related to the predicted received signal power. These conversion efficiency values are then evaluated to identify one or more of the waveform types that satisfies a predefined criterion and to select one of these (step 705). An example of a simple predefined criterion is whether a waveform type has an association with a highest level of RF-to-DC conversion efficiency—in other words, the criterion asks the question, "Is the level of RF-to-DC conversion efficiency of a given waveform type the highest from among all of the waveform types under consideration?"

In alternative embodiments, the criterion can evaluate additional factors that could lead to different results. For example, the criterion might further consider RF resource utilization, and in some instances produce different results. An illustration of this can be a criterion that seeks to find the waveform type that is associated with the highest level of RF-to-DC conversion efficiency without exceeding a predefined amount of RF resources. In such a case, it is possible that a waveform type associated with the highest level of RF-to-DC conversion efficiency might not be selected if it would exceed the predefined amount of RF resources. In a different example, the criterion seeks to identify the waveform type that is associated with the highest level of RF-to-DC conversion efficiency without exceeding a threshold amount of hardware resources within the WPTx 101. The threshold amount can be static (e.g., configured at or before the time of deployment of the WPRx and/or WPTx) or, in alternative embodiments, dynamically configurable according to the needs of the WPT system 100. The criteria for determining the threshold amount are application specific;

accordingly, a complete description of these criteria is beyond the scope of this disclosure.

The WPTx 101 then proceeds to generate and transmit a WPT signal 105 having the selected type of waveform (step 707). The WPT waveforms include but are not limited to, a single tone sine waveform, a multi-tone sine waveform with constant phase distribution, and a multi-tone sine waveform with random phase distribution. The single-tone sine waveform also includes any modulation on the carrier frequency, such as frequency modulation (chirp), or Direct Sequence Spread Spectrum (DSSS) modulation, and the like.

In this exemplary embodiment, step 707 comprises testing whether a multi-tone sine waveform is to be used (decision block 713). If not ("No" path out of decision block 713), then the RF generator 115 of the WPTx 101 is configured to generate a modulated single-tone sine waveform (step 715). Processing then progresses to step 717, which is described below.

If a multi-tone sine waveform is to be used ("Yes" path out of decision block 713), the RF generator 115 of the WPTx 101 is configured to generate the particular waveform type that was identified at step 705. This involves, for example, setting subcarrier spacing (step 719), setting the number of subcarriers to be used (step 721), and setting the subcarrier phase distribution (step 723).

Once the RF generator 115 of the WPTx 101 is configured to generate either the particular multi-tone sine waveform (configured in steps 719, 721, and 723) or the modulated single-tone sine waveform (configured in step 715), the WPTx 101 generates and transmits a WPT signal 105 having the selected waveform type (step 717).

In an aspect of some but not necessarily all embodiments consistent with the invention, the number of subcarriers, subcarrier spacing, phase distribution of subcarriers. RF input power at WPRx 103, and the corresponding WPRx's RF-to-DC conversion efficiency can be stored in a WPTx 101 (e.g., as a look-up table (LUT)). The WPTx 101 can then select a complete WPT configuration from the LUT which can achieve better RF-to-DC efficiency at the WPRx side.

In yet another embodiment, for a selected WPT waveform type, the WPTx 101 may adjust its transmission power to achieve better RF-to-DC efficiency at the WPRx side.

Figure 8A:
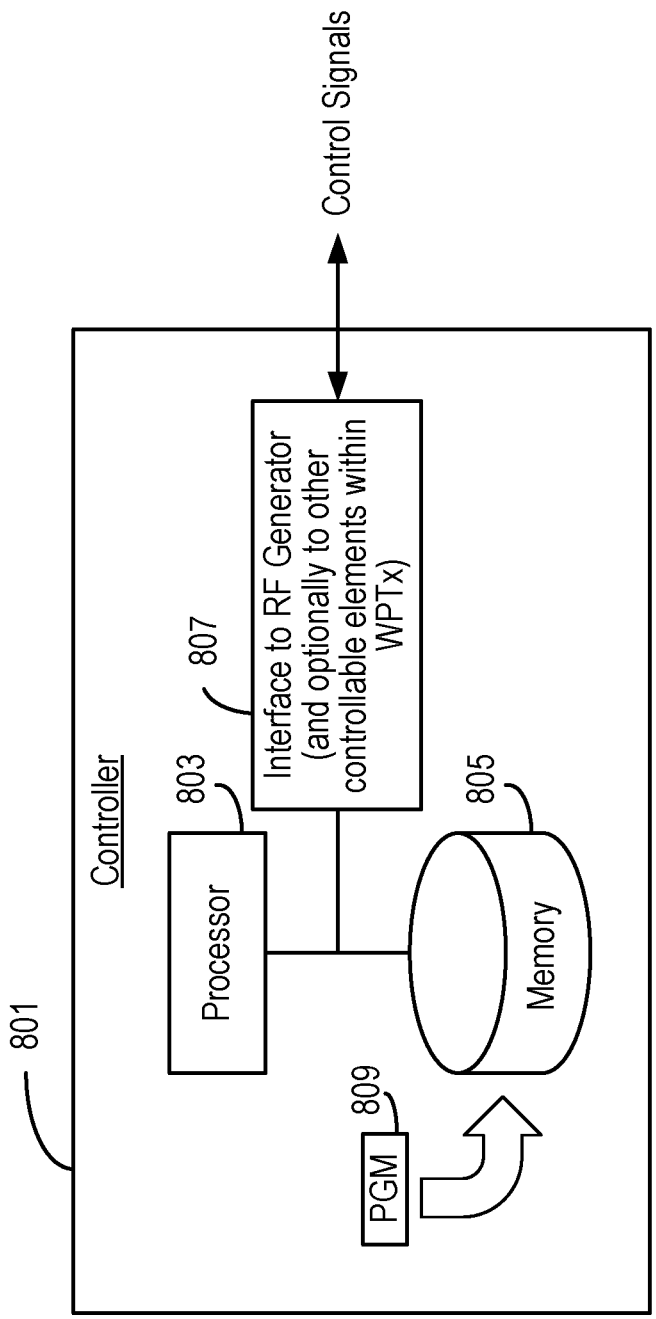
FIG. 8A shows an exemplary controller that may be included in the wireless power transmitter in accordance with some but not necessarily all exemplary embodiments consistent with the invention.

Further aspects of embodiments consistent with the invention will now be described with reference to FIG. 8A, which shows an exemplary controller 801 that may be included in the WPTx 101 to cause any and/or all of the herein-described and illustrated actions associated with the WPTx 101 to be performed. In particular, the controller 801 includes circuitry configured to carry out any one or any combination of the various functions described herein. Such circuitry could, for example, be entirely hard-wired circuitry (e.g., one or more Application Specific Integrated Circuits—"ASICs"). Depicted in the exemplary embodiment of FIG. 8A, however, is programmable circuitry, comprising a processor 803 coupled to one or more memory devices 805 (e.g., Random Access Memory, Magnetic Disc Drives, Optical Disk Drives, Read Only Memory, etc.) and to an interface 807 that enables bidirectional communication with other elements of the WPTx 101, such as the RF generator 115. A complete list of possible other elements is beyond the scope of this description.

The memory device(s) 805 store program means 809 (e.g., a set of processor instructions) configured to cause the processor 803 to control other system elements so as to carry out any of the aspects described herein. The memory device(s) 805 may also store data (not shown) representing various constant and variable parameters as may be needed by the processor 803 and/or as may be generated when carrying out its functions such as those specified by the program means 809.

Figure 8B:
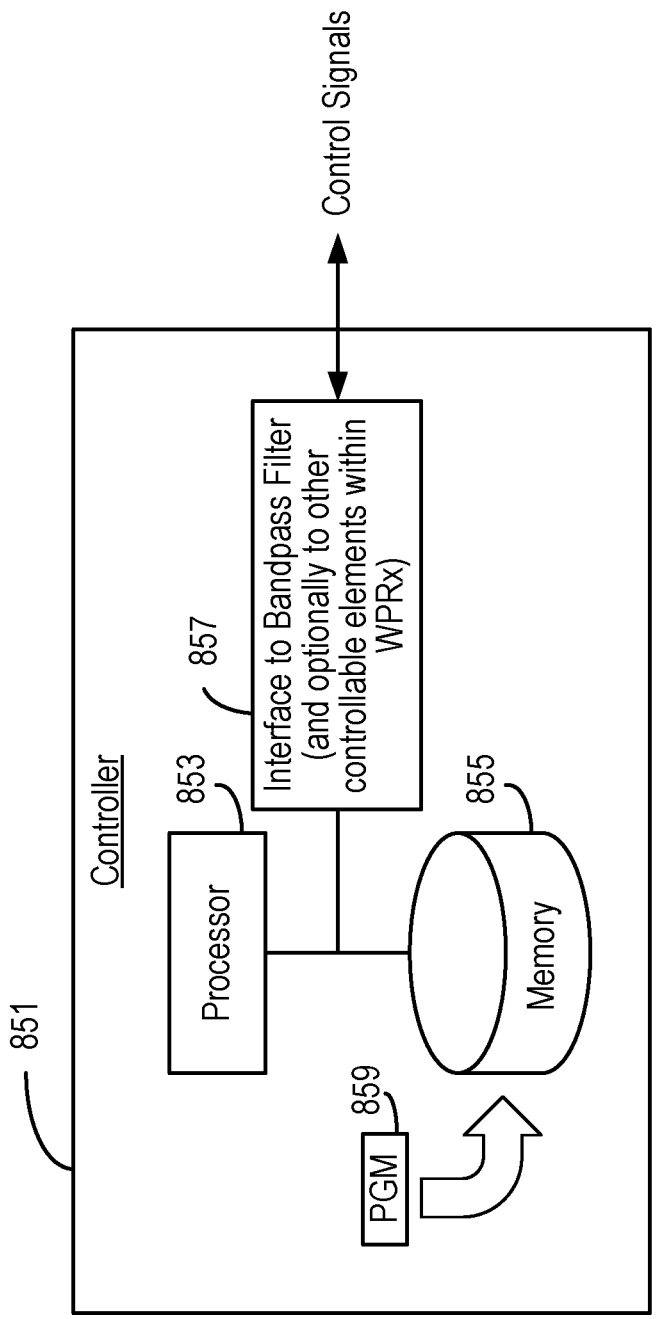
FIG. 8B shows an exemplary controller that may be included in the wireless power receiver in accordance with some but not necessarily all exemplary embodiments consistent with the invention.

As shown in FIG. 1, some embodiments of the WPRx 103 also include a controller 113. FIG. 8B shows an exemplary controller 851 that may be included in the WPRx 103 to cause any and/or all of the herein-described and illustrated actions associated with the WPRx 103 to be performed. In particular, the controller 851 includes circuitry configured to carry out any one or any combination of the various functions described herein. Such circuitry could, for example, be entirely hard-wired circuitry (e.g., one or more Application Specific Integrated Circuits-"ASICs"). Depicted in the exemplary embodiment of FIG. 8B, however, is programmable circuitry, comprising a processor 853 coupled to one or more memory devices 855 (e.g., Random Access Memory, Magnetic Disc Drives, Optical Disk Drives, Read Only Memory, etc.) and to an interface 857 that enables bidirectional communication with other elements of the WPRx 103, such as the bandpass filter 107, rectifier 109 and low-pass filter 111. A complete list of possible other elements is beyond the scope of this description.

The memory device(s) 855 store program means 859 (e.g., a set of processor instructions) configured to cause the processor 853 to control other system elements so as to carry out any of the aspects described herein. The memory device(s) 855 may also store data (not shown) representing various constant and variable parameters as may be needed by the processor 853 and/or as may be generated when carrying out its functions such as those specified by the program means 859.

Further aspects of embodiments consistent with the invention will now be described by means of an example. Consider a WPT system that utilizes a carrier frequency of 915 MHz and in which the WPTx has a transmission power of 20 dBm and transmission antenna gain of 15 dBi, and in which the WPRx has a reception antenna gain of 6 dBi. Assume the RF loss between its antenna and the rectifier is 3 dB. Assuming a free-space path loss between the WPTx and WPRx, the input power at the WPRx rectifier can be calculated as a function of the distance between the WPTx and the WPRx. For example, the input power at the WPRx will be 12 dBm when the distance is 0.5 meter; and will be −7.6 dBm when the distance is 5 meters.

Assuming that the WPRx RF-to-DC rectifier has a characteristic of Vth=0.2V and Vmax=5V, simulations were performed to calculate the RF-to-DC efficiency vs, input power for various WPT waveforms, and the simulation results are shown in FIG. 6A, which was described earlier. In the simulation, the multi-tone sine waveform has a subcarrier spacing of 30 kHz and the number of subcarriers is 100. The single-tone sine waveform has a carrier frequency of 915 MHz and chirp linear frequency modulation.

As shown in FIG. 6A, the multi-tone sine waveform with constant phase distribution among subcarriers is more suitable for low input power as it has a much higher RF-to-DC conversion efficiency than the other two waveform types. However, when the input power is higher than 10 dBm, the RF-to-DC conversion efficiency begins to degrade, and the multi-tone sine waveform with random phase distribution has a higher RF-to-DC conversion efficiency instead.

Using this as a basis for selection in the above example, when the distance between the WPTx and the WPRx is 0.5 meter (and the input power at the WPRx is 12 dBm), the WPTx should select the multi-tone sine waveform with random phase distribution because this will achieve an RF-to-DC conversion efficiency of 70% at the WPRx, which is ~25% higher than the efficiency obtained when using a multi-tone sine with constant phase distribution. However, when the WPRx is 5 meters away from WPTx (which, as stated above, will cause the input power at the WPRx to be −7.6 dBm) the WPTx should instead select the multi-tone sine waveform with constant phase distribution so that the RF-to-DC efficiency at the WPRx can be approximately 50%, which is much higher than what is achievable with the other waveform types.

To illustrate another point, if the selection criterion sought to find the waveform type having the best RF-to-DC conversion efficiency without using a random phase distribution (e.g., due to some hardware or other resource constraint at the WPTx), then when the WPRx is 0.5 meter away from the WPTx (and the input power at the WPRx is 12 dBm), the WPTx should select the single-tone waveform because its conversion efficiency outperforms that of the multi-tone sine waveform with constant phase distribution, and does so without requiring use of a random phase distribution.

To illustrate another point, the waveform types being considered in the above examples involved only a single-tone waveform, and multi-tone waveforms having a subcarrier spacing of 30 kHz. However, in a different embodiment that additionally includes multi-tone waveforms having subcarrier spacings of 15 kHz and 60 kHz, one ends up with a set of relationships as shown in FIG. 6B (described earlier). With these waveform types included among the waveform types that can be considered, an even better RF-to-DC conversion efficiency can be achieved in some circumstances. For example, when Pin=−15 dBm, a subcarrier spacing of 15 kHz with constant phase distribution results in an RF-to-DC conversion efficiency of ~30% which is 25% higher than what is attainable when subcarrier spacing is 60 kHz with constant phase distribution.

Various embodiments consistent with the invention provide advantages over conventional WPT technology. These advantages include more efficient use of RF resources, and overall improvement of RF-to-DC conversion efficiency.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

One embodiment of the present disclosure relates to a method (700, 750) of wirelessly transferring power by means of radiative coupling from a wireless power transmitter, WPTx, (101) to a wireless power receiver, WPRx, (103) the method (700, 750) being performed by the WPTx (101) and comprising:
    obtaining (701, 709, 711) a set of conversion efficiency/input power relationships (501, 503, 505, 601, 603, 605, 651, 653, 655, 657, 659, 661) by, for each one of a plurality of different waveform types (300, 400), obtaining for said each one of the different waveform types (300, 400), a relationship (501, 503, 505, 601, 603, 605, 651, 653, 655, 657, 659, 661) between input signal power at the WPRx (103) and efficiency of radiofrequency-to-direct current, RF-to-DC, conversion of the input signal power by the WPRx (103);
    obtaining (703) a prediction that indicates at what received signal power level a received transmission of power from the WPTx (101) will be at the WPRx (103);
    using (705) the prediction of received signal power at the WPRx (103) and the set of conversion efficiency/input power relationships (501, 503, 505, 601, 603, 605, 651, 653, 655, 657, 659, 661) to identify which one or more of the different waveform types (300, 400) satisfies a predetermined selection criterion and selecting one of the one or more identified waveform types (300, 400); and
    transmitting (707), from the WPTx (101), a wireless power transfer signal (105) having the selected waveform type (300, 400),
wherein the plurality of different waveforms types (300, 400) comprises:
    a multi-tone signal having a constant phase distribution (300); and
    a multi-tone signal having a random phase distribution (400).

In one embodiment of the present disclosure, multi-tone signals with constant or random phase distribution are used. The inventor has realized that using single-tone signals may not always comply with current regulations in relations to the utilized spectrum. For example, single tone signals may have a very wide spectrum which may comprise regions of the spectrum that are legally assigned for other purposes and therefore single-tone signals may negatively affect other signals, such as carrier signals, utilizing a portion of the spectrum of the single-tone signal and/or occupying licensed portions of the spectrum.

For this reason, the inventor has realized that multi-tone signals are preferred with respect to single-tone signals. In addition, multi-tone signals with random distribution may have the least impact on the spectrum.

Further, in one embodiment of the present disclosure, several multi-tone signals with different sub-carrier spacing, or different constant or random phases may be utilized in the presently disclosed method and the method may effectively select the most suitable signal for a given condition.

In one embodiment of the present disclosure, used multi-tone signals may have different sub-carrier spacing.

EMBODIMENTS OF THE INVENTION

1. A method (700, 750) of wirelessly transferring power by means of radiative coupling from a wireless power transmitter, WPTx, (101) to a wireless power receiver, WPRx, (103) the method (700, 750) being performed by the WPTx (101) and comprising:
    obtaining (701, 709, 711) a set of conversion efficiency/input power relationships (501, 503, 505, 601, 603, 605, 651, 653, 655, 657, 659, 661) by, for each one of a plurality of different waveform types (300, 400), obtaining for said each one of the different waveform types (300, 400), a relationship (501, 503, 505, 601, 603, 605, 651, 653, 655, 657, 659, 661) between input signal power at the WPRx (103) and efficiency of radiofrequency-to-direct current, RF-to-DC, conversion of the input signal power by the WPRx (103);
    obtaining (703) a prediction that indicates at what received signal power level a received transmission of power from the WPTx (101) will be at the WPRx (103);
    using (705) the prediction of received signal power at the WPRx (103) and the set of conversion efficiency/ input power relationships (501, 503, 505, 601, 603, 605, 651, 653, 655, 657, 659, 661) to identify which one or more of the different waveform types (300, 400) satisfies a predetermined selection criterion and selecting one of the one or more identified waveform types (300, 400); and transmitting (707), from the WPTx (101), a wireless power transfer signal (105) having the selected waveform type (300, 400).

2. The method (700, 750) of embodiment 1, wherein the predetermined selection criterion is association with a most efficient RF-to-DC conversion of the input signal power by the WPRx (103).

3. The method (700, 750) of any one of the previous embodiments, wherein obtaining for said each one of the waveform types, the relationship (501, 503, 505, 601, 603, 605, 651, 653, 655, 657, 659, 661) between input signal power at the WPRx (103) and efficiency of RF-to-DC conversion by the WPRx comprises:

obtaining (709) one or more RF-to-DC conversion characteristics of the WPRx (103); and using (711) the one or more RF-to-DC characteristics of the WPRx (103) to derive, for said each one of the different waveform types (300, 400), the relationship (501, 503, 505, 601, 603, 605, 651, 653, 655, 657, 659, 661) between input signal power at the WPRx (103) and efficiency of RF-to-DC conversion by the WPRx (103).

4. The method (700, 750) of any one of the previous embodiments, wherein the plurality of different waveform types (300, 400) comprises:

a single-tone signal;

a multi-tone signal having a constant phase distribution (300); and a multi-tone signal having a random phase distribution (400).

5. The method (700, 750) of any one of the previous embodiments, wherein the plurality of different waveform types (300, 400) comprises:

a first multi-tone signal having a first sub-carrier spacing; and a second multi-tone signal having a second sub-carrier spacing, wherein the first sub-carrier spacing is different from the second sub-carrier spacing.

6. The method (700, 750) of any one of the previous embodiments, comprising:

obtaining a model of an RF channel between the WPTx (101) and the WPRx (103); and using the model of the RF channel to obtain the prediction of received signal power at the WPRx (103).

7. The method (700, 750) of any one of embodiments 1-5, wherein obtaining (703) the prediction of received signal power at the WPRx (103) comprises:

receiving, from the WPRx (103), a measure of received signal power associated with a previously transmitted signal from the WPTx (101).

8. The method (700, 750) of any one of the previous embodiments, comprising:

obtaining information about radio resources (200) that are available for use by the WPTx (101), wherein the radio resources (200) are defined in the time and frequency domains, wherein using (705) the prediction of received signal power at the WPRx (103) and the set of conversion efficiency/input power relationships to identify which one or more of the different waveform types (300, 400) satisfies the predetermined selection criterion comprises:

identifying which one or more of the different waveform types (300, 400) is compatible with transmission on the available radio resources (200) and is associated with a measure of RF-to-DC conversion efficiency between the WPTx (101) and the WPRx (103) that is not less than the measure of RF-to-DC conversion efficiency of any other waveform type (300, 400) that is compatible with the transmission on the available radio resources (200).

9. The method (700, 750) of any one of the previous embodiments, comprising:

receiving (709) one or more RF-to-DC conversion characteristics of the WPRx (103), wherein obtaining (701) for said each one of the different waveform types, the relationship (501, 503, 505, 601, 603, 605, 651, 653, 655, 657, 659, 661) between input signal power at the WPRx (103) and efficiency of RF-to-DC conversion of the input signal power by the WPRx (103) comprises:

using (711) the received one or more RF-to-DC conversion characteristics of the WPRx (103) as a basis for determining for said each one of the different waveform types, the relationship (501, 503, 505, 601, 603, 605, 651, 653, 655, 657, 659, 661) between input signal power at the WPRx (103) and efficiency of RF-to-DC conversion of the input signal power by the WPRx (103).

10. The method (700, 750) of embodiment 9, wherein the RF-to-DC conversion characteristics of the WPRx (103) comprise one or more of:

an RF-to-DC threshold voltage (Vth) of an RF-to-DC rectifier circuit (109) of the WPRx (103); and a maximum input voltage (Vmax) of the RF-to-DC rectifier circuit (109) of the WPRx (103).

11. The method (700, 750) of any one of embodiments 1-8, wherein obtaining (701) for said each one of the different waveform types (300, 400), the relationship (501, 503, 505, 601, 603, 605, 651, 653, 655, 657, 659, 661) between input signal power at the WPRx (103) and efficiency of RF-to-DC conversion of the input signal power by the WPRx (103) comprises:

receiving from the WPRx (103), for said each one of the different waveform types (300, 400), the relationship (501, 503, 505, 601, 603, 605, 651, 653, 655, 657, 659, 661) between input signal power at the WPRx (103) and efficiency of RF-to-DC conversion of the input signal power by the WPRx (103).

12. A method of wirelessly transferring power by means of radiative coupling from a wireless power transmitter, WPTx (101), to a wireless power receiver, WPRx (103), the method being performed by the WPRx (103) and comprising:

communicating one or more RF-to-DC conversion characteristics of the WPRx (103) to the WPTx (101);

receiving a radiofrequency, RF, wireless power transfer signal (105) transmitted by the WPTx (101); and converting (107, 109, 111) the received RF wireless power transfer signal (105) into a direct current, DC, signal 121.

13. The method of embodiment 12, wherein the one or more RF-to-DC conversion characteristics of the WPRx (103) comprise one or more of:
an RF-to-DC threshold voltage (Vth) of an RF-to-DC rectifier circuit of the WPRx (103); and
a maximum input voltage (Vmax) of the RF-to-DC rectifier circuit of the WPRx (103).

14. The method of any one of embodiments 12 and 13, comprising:
measuring a received power level of a signal transmitted by the WPTx (101); and
communicating the measured received power level to the WPTx (101).

15. The method of any one of embodiments 12 and 13, further comprising:
obtaining information about a wireless power transfer signal (105), wherein the information comprises one or more of:
a carrier frequency of the wireless power transfer signal (105);
a bandwidth (Nsc) of the wireless power transfer signal (105); and
a subcarrier spacing of the wireless power transfer signal (105); and
configuring a receiver of the WPRx (103) based on the information about the wireless power transfer signal.

16. A method of wirelessly transferring power by means of radiative coupling from a wireless power transmitter, WPTx, (101) to a wireless power receiver, WPRx, (103) the method being performed by the WPRx (103) and comprising:
communicating a set of conversion efficiency/input power relationships (501, 503, 505, 601, 603, 605, 651, 653, 655, 657, 659, 661) to the WPTx (103), wherein the set of conversion efficiency/input power relationships (501, 503, 505, 601, 603, 605, 651, 653, 655, 657, 659, 661) comprises, for each one of a plurality of different waveform types, a relationship (501, 503, 505, 601, 603, 605, 651, 653, 655, 657, 659, 661) between input signal power at the WPRx (103) and efficiency of radiofrequency-to-direct current, RF-to-DC, conversion of the input signal power by the WPRx (103);
receiving a radiofrequency, RF, wireless power transfer signal (105) transmitted by the WPTx (101); and
converting (107, 109, 111) the received RF wireless power transfer signal (105) into a direct current, DC, signal (121).

17. The method of embodiment 16, comprising:
measuring a received power level of a signal transmitted by the WPTx (101); and
communicating the measured received power level to the WPTx (101).

18. The method of any one of embodiments 16 and 17, further comprising:
obtaining information about a wireless power transfer signal, wherein the information comprises one or more of:
a carrier frequency of the wireless power transfer signal (105);
a bandwidth (Nsc) of the wireless power transfer signal (105); and
a subcarrier spacing of the wireless power transfer signal (105); and
configuring a receiver of the WPRx (103) based on the information about the wireless power transfer signal.

19. A computer program (809) comprising instructions that, when executed by at least one processor (803), causes the at least one processor (803) to carry out the method according to any one of embodiments 1-11.

20. A carrier comprising the computer program (809) of embodiment 19, wherein the carrier is one of an electronic signal, an optical signal, a radio signal, and a computer readable storage medium (805).

21. A computer program (859) comprising instructions that, when executed by at least one processor (853), causes the at least one processor (853) to carry out the method according to any one of embodiments 12-15.

22. A carrier comprising the computer program (859) of embodiment 21, wherein the carrier is one of an electronic signal, an optical signal, a radio signal, and a computer readable storage medium (855).

23. A computer program (859) comprising instructions that, when executed by at least one processor (853), causes the at least one processor (853) to carry out the method according to any one of embodiments 16-18.

24. A carrier comprising the computer program (859) of embodiment 23, wherein the carrier is one of an electronic signal, an optical signal, a radio signal, and a computer readable storage medium (855).

25. A wireless power transmitter, WPTx, (101) for wirelessly transferring power by means of radiative coupling from the WPTx (101) to a wireless power receiver, WPRx, (103), the WPTx (101) being configured to:
obtain (701, 709, 711) a set of conversion efficiency/input power relationships (501, 503, 505, 601, 603, 605, 651, 653, 655, 657, 659, 661) by, for each one of a plurality of different waveform types (300, 400), obtaining for said each one of the different waveform types (300, 400), a relationship (501, 503, 505, 601, 603, 605, 651, 653, 655, 657, 659, 661) between input signal power at the WPRx (103) and efficiency of radiofrequency-to-direct current, RF-to-DC, conversion of the input signal power by the WPRx (103);
obtain (703) a prediction that indicates at what received signal power level a received transmission of power from the WPTx (101) will be at the WPRx (103);
use (705) the prediction of received signal power at the WPRx (103) and the set of conversion efficiency/input power relationships (501, 503, 505, 601, 603, 605, 651, 653, 655, 657, 659, 661) to identify which one or more of the different waveform types (300, 400) satisfies a predetermined selection criterion and select one of the one or more identified waveform types (300, 400); and
transmit (707), from the WPTx (101), a wireless power transfer signal (105) having the selected waveform type (300, 400).

26. The WPTx (101) of embodiment 25, wherein the predetermined selection criterion is association with a most efficient RF-to-DC conversion of the input signal power by the WPRx (103).

27. The WPTx (101) of any one of embodiments 25-26, wherein obtaining for said each one of the waveform types, the relationship (501, 503, 505, 601, 603, 605, 651, 653, 655, 657, 659, 661) between input signal power at the WPRx (103) and efficiency of RF-to-DC conversion by the WPRx comprises:
obtaining (709) one or more RF-to-DC conversion characteristics of the WPRx (103); and using (711) the one or more RF-to-DC characteristics of the WPRx (103) to derive, for said each one of the different waveform types (300, 400), the relationship (501, 503, 505, 601, 603, 605, 651, 653, 655, 657, 659, 661) between input signal power at the WPRx (103) and efficiency of RF-to-DC conversion by the WPRx (103).

28. The WPTx (101) of any one of embodiments 25-27, wherein the plurality of different waveform types (300, 400) comprises:
    a single-tone signal;
    a multi-tone signal having a constant phase distribution (300); and
    a multi-tone signal having a random phase distribution (400).

29. The WPTx (101) of any one of embodiments 25-28, wherein the plurality of different waveform types (300, 400) comprises:
    a first multi-tone signal having a first sub-carrier spacing; and
    a second multi-tone signal having a second sub-carrier spacing,
    wherein the first sub-carrier spacing is different from the second sub-carrier spacing.

30. The WPTx (101) of any one of embodiments 25-29, further configured to: obtain a model of an RF channel between the WPTx (101) and the WPRx (103); and use the model of the RF channel to obtain the prediction of received signal power at the WPRx (103).

31. The WPTx (101) of any one of embodiments 25-29, wherein the WPTx (101) is configured to obtain (703) the prediction of received signal power at the WPRx (103) by:
    receiving, from the WPRx (103), a measure of received signal power associated with a previously transmitted signal from the WPTx (101).

32. The WPTx (101) of any one of embodiments 25-31, further configured to:
    obtain information about radio resources (200) that are available for use by the WPTx (101), wherein the radio resources (200) are defined in the time and frequency domains,
    wherein the WPTx (101) is configured to use (705) the prediction of received signal power at the WPRx (103) and the set of conversion efficiency/input power relationships to identify which one or more of the different waveform types (300, 400) satisfies the predetermined selection criterion by:
    identifying which one or more of the different waveform types (300, 400) is compatible with transmission on the available radio resources (200) and is associated with a measure of RF-to-DC conversion efficiency between the WPTx (101) and the WPRx (103) that is not less than the measure of RF-to-DC conversion efficiency of any other waveform type (300, 400) that is compatible with the transmission on the available radio resources (200).

33. The WPTx (101) of any one embodiments 25-32, further configured to:
    receive (709) one or more RF-to-DC conversion characteristics of the WPRx (103),
    wherein the WPTx (101) is configured to obtain (701) for said each one of the different waveform types, the relationship (501, 503, 505, 601, 603, 605, 651, 653, 655, 657, 659, 661) between input signal power at the WPRx (103) and efficiency of RF-to-DC conversion of the input signal power by the WPRx (103) by:
    using (711) the received one or more RF-to-DC conversion characteristics of the WPRx (103) as a basis for determining for said each one of the different waveform types, the relationship (501, 503, 505, 601, 603, 605, 651, 653, 655, 657, 659, 661) between input signal power at the WPRx (103) and efficiency of RF-to-DC conversion of the input signal power by the WPRx (103).

34. The WPTx (101) of embodiment 33, wherein the RF-to-DC conversion characteristics of the WPRx (103) comprise one or more of:
    an RF-to-DC threshold voltage (Vth) of an RF-to-DC rectifier circuit (109) of the WPRx (103); and
    a maximum input voltage (Vmax) of the RF-to-DC rectifier circuit (109) of the WPRx (103).

35. The WPTx (101) of any one of embodiments 25-32, wherein the WPTx (101) is configured to obtain (701) for said each one of the different waveform types (300, 400), the relationship (501, 503, 505, 601, 603, 605, 651, 653, 655, 657, 659, 661) between input signal power at the WPRx (103) and efficiency of RF-to-DC conversion of the input signal power by the WPRx (103) by:
    receiving from the WPRx (103), for said each one of the different waveform types (300, 400), the relationship (501, 503, 505, 601, 603, 605, 651, 653, 655, 657, 659, 661) between input signal power at the WPRx (103) and efficiency of RF-to-DC conversion of the input signal power by the WPRx (103).

36. A wireless communication device, WCD, comprising the WPTx (101), of any of embodiments 25-35.

37. The WCD of embodiment 36, wherein the WCD is a mobile phone, a wireless access point, or a base station.

38. A wireless power receiver, WPRx, (103) for wirelessly transferring power by means of radiative coupling from a wireless power transmitter, WPTx (101), to the wireless power receiver, WPRx (103), wherein the WPRx (103) is configured to:
    communicate one or more RF-to-DC conversion characteristics of the WPRx (103) to the WPTx (101);
    receive a radiofrequency, RF, wireless power transfer signal (105) transmitted by the WPTx (101); and
    convert (107, 109, 111) the received RF wireless power transfer signal (105) into a direct current, DC, signal 121.

39. The WPRx (103) of embodiment 38, wherein the one or more RF-to-DC conversion characteristics of the WPRx (103) comprise one or more of:
    an RF-to-DC threshold voltage (Vth) of an RF-to-DC rectifier circuit of the WPRx (103); and
    a maximum input voltage (Vmax) of the RF-to-DC rectifier circuit of the WPRx (103).

40. The WPRx (103) of any one of embodiments 38 and 39, further configured to:
    measure a received power level of a signal transmitted by the WPTx (101); and
    communicate the measured received power level to the WPTx (101).

41. The WPRx (103) of any one of embodiments 38 and 39, further configured to:
    obtain information about a wireless power transfer signal (105), wherein the information comprises one or more of:
    a carrier frequency of the wireless power transfer signal (105);
    a bandwidth (Nsc) of the wireless power transfer signal (105); and a subcarrier spacing of the wireless power transfer signal (105); and configure a receiver of the WPRx (103) based on the information about the wireless power transfer signal.

42. A wireless power receiver, WPRx, (103) for wirelessly transferring power by means of radiative coupling from a wireless power transmitter, WPTx, (101) to the WPRx, (103) the WPRx (103), wherein the WPRx, (103) is configured to:

communicate a set of conversion efficiency/input power relationships (501, 503, 505, 601, 603, 605, 651, 653, 655, 657, 659, 661) to the WPTx (103), wherein the set of conversion efficiency/input power relationships (501, 503, 505, 601, 603, 605, 651, 653, 655, 657, 659, 661) comprises, for each one of a plurality of different waveform types, a relationship (501, 503, 505, 601, 603, 605, 651, 653, 655, 657, 659, 661) between input signal power at the WPRx (103) and efficiency of radiofrequency-to-direct current, RF-to-DC, conversion of the input signal power by the WPRx (103);

receive a radiofrequency, RF, wireless power transfer signal (105) transmitted by the WPTx (101); and convert (107, 109, 111) the received RF wireless power transfer signal (105) into a direct current, DC, signal (121).

43. The WPRx, (103) of embodiment 42, further configured to:

measure a received power level of a signal transmitted by the WPTx (101); and communicate the measured received power level to the WPTx (101).

44. The WPRx (103) of any one of embodiments 42 and 43, further configured to:

obtain information about a wireless power transfer signal, wherein the information comprises one or more of:

a carrier frequency of the wireless power transfer signal (105);

a bandwidth (Nsc) of the wireless power transfer signal (105); and a subcarrier spacing of the wireless power transfer signal (105); and configure a receiver of the WPRx (103) based on the information about the wireless power transfer signal.

45. A wireless communication device, WCD, comprising the WPRx (103), of any of embodiments 38-44.

46. The WCD of embodiment 45, wherein the WCD is a sensor device or an Internet of Things, IoT, device.

47. A method (700, 750) of wirelessly transferring power by means of radiative coupling from a wireless power transmitter, WPTx, (101) to a wireless power receiver, WPRx, (103) the method (700, 750) being performed by the WPTx (101) and comprising:

obtaining (701, 709, 711) a set of conversion efficiency/input power relationships (501, 503, 505, 601, 603, 605, 651, 653, 655, 657, 659, 661) by, for each one of a plurality of different waveform types (300, 400), obtaining for said each one of the different waveform types (300, 400), a relationship (501, 503, 505, 601, 603, 605, 651, 653, 655, 657, 659, 661) between input signal power at the WPRx (103) and efficiency of radiofrequency-to-direct current, RF-to-DC, conversion of the input signal power by the WPRx (103);

obtaining (703) a prediction that indicates at what received signal power level a received transmission of power from the WPTx (101) will be at the WPRx (103);

using (705) the prediction of received signal power at the WPRx (103) and the set of conversion efficiency/input power relationships (501, 503, 505, 601, 603, 605, 651, 653, 655, 657, 659, 661) to identify which one or more of the different waveform types (300, 400) satisfies a predetermined selection criterion and selecting one of the one or more identified waveform types (300, 400); and transmitting (707), from the WPTx (101), a wireless power transfer signal (105) having the selected waveform type (300, 400), wherein the plurality of different waveforms types (300, 400) comprises:

a multi-tone signal having a constant phase distribution (300); and a multi-tone signal having a random phase distribution (400).

48. The method (700, 750) of embodiment 47, wherein the plurality of different waveform types (300, 400) comprises:

a first multi-tone signal having a first sub-carrier spacing; and a second multi-tone signal having a second sub-carrier spacing, wherein the first sub-carrier spacing is different from the second sub-carrier spacing.

The invention claimed is:

1. A method of wirelessly transferring power by means of radiative coupling from a wireless power transmitter (WPTx) to a wireless power receiver (WPRx), the method being performed by the WPTx and comprising:

obtaining a set of conversion efficiency/input power relationships by, for each one of a plurality of different waveform types, obtaining for said each one of the different waveform types, a relationship between input signal power at the WPRx and efficiency of radiofrequency-to-direct current (RF-to-DC) conversion of the input signal power by the WPRx;

obtaining a prediction that indicates at what received signal power level a received transmission of power from the WPTx will be at the WPRx;

using the prediction of received signal power at the WPRx and the set of conversion efficiency/input power relationships to identify which one or more of the different waveform types satisfies a predetermined selection criterion and selecting one of the one or more identified waveform types; and transmitting, from the WPTx, a wireless power transfer signal having the selected waveform type, wherein the plurality of different waveforms types comprises:

a multi-tone signal having a constant phase distribution; and a multi-tone signal having a random phase distribution.

2. The method of claim 1, wherein the predetermined selection criterion is associated with a most efficient RF-to-DC conversion of the input signal power by the WPRx.

3. The method of claim 1, wherein obtaining for said each one of the waveform types, the relationship between input signal power at the WPRx and efficiency of RF-to-DC conversion by the WPRx comprises:

obtaining one or more RF-to-DC conversion characteristics of the WPRx; and using the one or more RF-to-DC characteristics of the WPRx to derive, for said each one of the different waveform types, the relationship between input signal power at the WPRx and efficiency of RF-to-DC conversion by the WPRx.

4. The method of claim 1, wherein the plurality of different waveform types further comprises a single-tone signal.

5. The method of claim 1, wherein the plurality of different waveform types comprises:
   a first multi-tone signal having a first sub-carrier spacing; and
   a second multi-tone signal having a second sub-carrier spacing,
   wherein the first sub-carrier spacing is different from the second sub-carrier spacing.

6. The method of claim 1, further comprising:
   obtaining a model of an RF channel between the WPTx and the WPRx; and
   using the model of the RF channel to obtain the prediction of received signal power at the WPRx.

7. A wireless power transmitter (WPTx) configured to wirelessly transfer power by radiative coupling from the WPTx to a wireless power receiver (WPRx), the WPTx being further configured to perform the method of claim 1.

8. A wireless communication device (WCD) comprising the WPTx of claim 7.

9. The WCD of claim 8, wherein the WCD is a mobile phone, a wireless access point, or a base station.

* * * * *